US012177131B2

(12) United States Patent
Guim Bernat et al.

(10) Patent No.: US 12,177,131 B2
(45) Date of Patent: Dec. 24, 2024

(54) AUTOMATED NODE CONFIGURATION TUNING IN EDGE SYSTEMS

(71) Applicant: Intel Corporation, Santa Clara, CA (US)

(72) Inventors: Francesc Guim Bernat, Barcelona (ES); Kshitij Arun Doshi, Tempe, AZ (US); Karol Weber, Gdansk (PL); Marek Piotrowski, Pepowo (PL); Piotr Wysocki, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/278,517

(22) PCT Filed: Jun. 25, 2021

(86) PCT No.: PCT/PL2021/050045
§ 371 (c)(1),
(2) Date: Aug. 23, 2023

(87) PCT Pub. No.: WO2022/271042
PCT Pub. Date: Dec. 29, 2022

(65) Prior Publication Data
US 2024/0236017 A1     Jul. 11, 2024

(51) Int. Cl.
*H04L 47/70* (2022.01)
*H04L 41/0816* (2022.01)
*H04L 47/80* (2022.01)

(52) U.S. Cl.
CPC ........ *H04L 47/822* (2013.01); *H04L 41/0816* (2013.01); *H04L 47/805* (2013.01)

(58) Field of Classification Search
CPC ........... H04L 5/0057; H04L 2012/5631; G06F 9/5072
See application file for complete search history.

(56) References Cited

U.S. PATENT DOCUMENTS 8,359,223 B2    1/2013  Chi et al.
11,494,239 B2 * 11/2022  Fernandez Orellana ....................
                                             G06F 9/505

(Continued)

FOREIGN PATENT DOCUMENTS

WO    WO-2022271042 A1    12/2022

OTHER PUBLICATIONS

"International Application Serial No. PCT/PL2021/050045, International Search Report mailed Mar. 9, 2022", 4 pgs.

(Continued)

*Primary Examiner* — Chirag R Patel
(74) *Attorney, Agent, or Firm* — Schwegman Lundberg & Woessner, P.A.

(57) ABSTRACT

A computing node includes a NIC and processing circuitry configured to select a subset of computing resources from a set of available computing resources to initiate a parameter sweep associated with a parameter sweep request received. A plurality of settings is applied to each computing resource of the subset to generate a plurality of resource mappings during the parameter sweep. Each resource mapping of the plurality of resource mappings indicates at least one computing resource of the subset and a corresponding at least one setting of the plurality of settings. Telemetry information for the subset of computing resources is retrieved, the telemetry information is generated during the parameter sweep. A resource mapping of the plurality of resource mappings is selected based on a comparison of the telemetry information with an SLO. A reconfiguration of the available computing resources is performed based on the selected resource mapping.

20 Claims, 16 Drawing Sheets

(56) References Cited

U.S. PATENT DOCUMENTS

| | | | |
|---|---|---|---|
| 2013/0111033 A1 | 5/2013 | Mao et al. | |
| 2016/0110657 A1* | 4/2016 | Gibiansky | G06N 20/00 |
| | | | 706/12 |
| 2018/0375772 A1* | 12/2018 | Wickeraad | G06F 16/9017 |
| 2020/0007460 A1* | 1/2020 | Guim Bernat | H04L 47/765 |
| 2021/0067599 A1* | 3/2021 | Gill | H04L 67/53 |
| 2021/0097429 A1* | 4/2021 | Jia | G06N 20/00 |
| 2022/0188700 A1* | 6/2022 | Khavronin | G06Q 30/0201 |
| 2022/0255966 A1* | 8/2022 | Sienicki | H04L 63/123 |

OTHER PUBLICATIONS

"International Application Serial No. PCT/PL2021/050045, Written Opinion mailed Mar. 9, 2022", 10 pgs.
Pozza, Matteo, et al., "On Reconfiguring 5G Network Slices", IEEE Journal on Selected Areas in Communications, vol. 38, No. 7, (Apr. 9, 2020), 1542-1554.
"International Application Serial No. PCT PL2021 050045, International Preliminary Report on Patentability mailed Jan. 4, 2024", 12 pgs.

* cited by examiner

AUTOMATED NODE CONFIGURATION TUNING IN EDGE SYSTEMS

This application is a U.S. National Stage Filing under 35 U.S.C. 371 from International Application No. PCT/PL2021/050045, filed Jun. 25, 2021 and published in English as WO 2022/271042 on Dec. 29, 2022, which is incorporated herein by reference in its entirety.

BACKGROUND

Edge computing, at a general level, refers to the implementation, coordination, and use of computing and resources at locations closer to the "edge" or collection of "edges" of the network. The purpose of this arrangement is to reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use cases that are projected to extensively utilize edge computing include connected self-driving cars, surveillance, Internet of Things (IoT) device data analytics, video encoding and analytics, location-aware services, device sensing in Smart Cities, among many other networks, and compute-intensive services.

Edge computing may, in some scenarios, offer node management services with orchestration and management for applications and coordinated service instances among many types of storage and compute resources. Edge computing is also expected to be closely integrated with existing use cases and technology developed for IoT and Fog/distributed networking configurations including node configuration tuning, as endpoint devices, clients, and gateways attempt to access network resources and applications at locations closer to the edge of the network while optimally utilizing network resources. Edge computing can also be used to help enhance communication between user devices or between IoT devices.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following embodiments generally relate to automated node configuration tuning in Multi-Access Edge Computing (MEC) systems which can be operated by different parties (e.g., mobile network operators, or MNOs). The disclosed techniques may use resource configuration functions (RCF) (e.g., in a resource configuration component within a computing node such as an orchestrator node or within a board management controller) to facilitate scalable automation support for the reconfiguration of computing resources (e.g., processing resources, storage resources, power management resources, communication resources, network bandwidth resources, etc.). Example embodiments can be implemented in systems similar to those shown in any of the systems described below in reference to FIGS. 1-8C. Additional description of the RCF and the resource configuration component using the RCF is provided herein below in connection with at least FIG. 9-FIG. 14.

Figure 1:
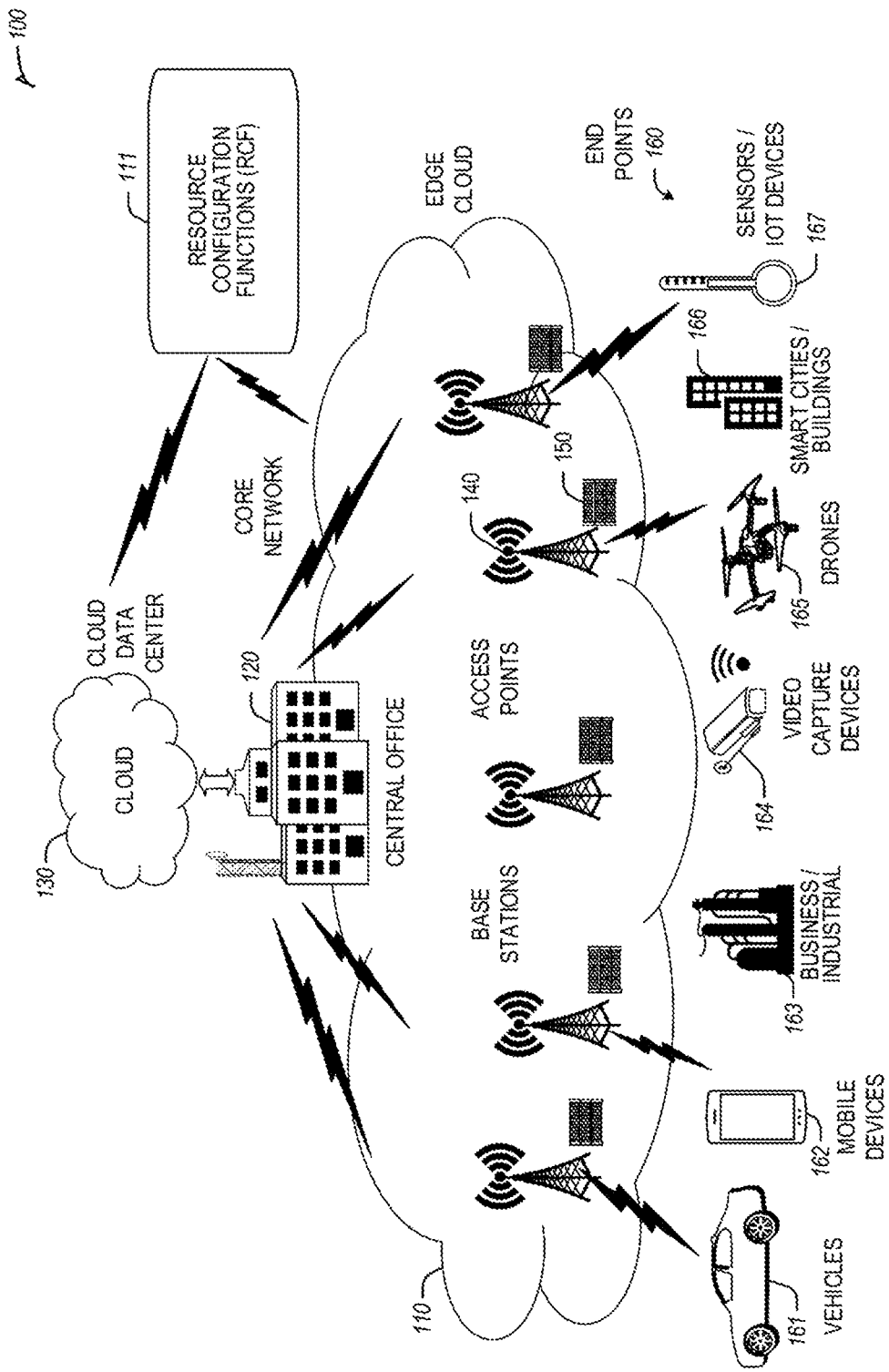
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power are often constrained. Thus, edge computing attempts to reduce the number of resources needed for network services, through the distribution of more resources that are located closer to both geographically and in-network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their infrastructures. These include a variety of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use cases (e.g., autonomous driving or video surveillance) for connected client devices. As an example, base stations may be augmented with compute and acceleration resources to directly process service workloads for the connected user equipment, without further communicating data via backhaul networks. As another example, central office network management hardware may be replaced with standardized compute hardware that performs virtualized network functions and offers compute resources for the execution of services and consumer functions for connected devices. Within edge computing networks, there may be scenarios in services in which the compute resource will be "moved" to the data, as well as scenarios in which the data will be "moved" to the compute resource. As an example, base station compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle.

In some aspects, the edge cloud 110 and the cloud data center 130 can be configured with resource configuration functions (RCF) 111. As used herein, the term "resource configuration functions" includes one or more of the following functionalities: (1) automating the adaptation of a machine or any device within it, by an application programming interface (API) and policy-driven optimization process (e.g., configuration based on a service level objective or SLO); (2) intermediate between a resource orchestration subsystem with obscuration of hidden knobs (or settings) and with autonomous ability to select and apply various canonical optimization methods (e.g., stochastic selection, interaction models, best-fit, hill climbing, etc.); (3) utilize separate interfaces for driving exploration, retrieving results without un-obscuring hidden knobs, specifying SLOs, accessing application telemetry, and registering cryptographically protected settings control policies. In some embodiments, RCF 111 includes selecting a subset of computing resources from a set of available computing resources of a node to initiate a parameter sweep. During the parameter sweep, the RCF 111 are used to apply a plurality of settings to each computing resource of the subset to generate a plurality of resource mappings. Each resource mapping of the plurality of resource mappings indicates at least one computing resource of the subset and a corresponding at least one setting of the plurality of settings. The RCF 111 further include retrieving telemetry information for the subset of computing resources, where the telemetry information is generated during the parameter sweep. The RCF 111 further includes selecting a resource mapping of the plurality of resource mappings based on a comparison of the telemetry information with an SLO associated with the request and performing a reconfiguration of the available computing resources based on the selected resource mapping. Additional functionalities and techniques associated with the RCF 111 are discussed in connection with FIG. 9-FIG. 14.

Figure 2:
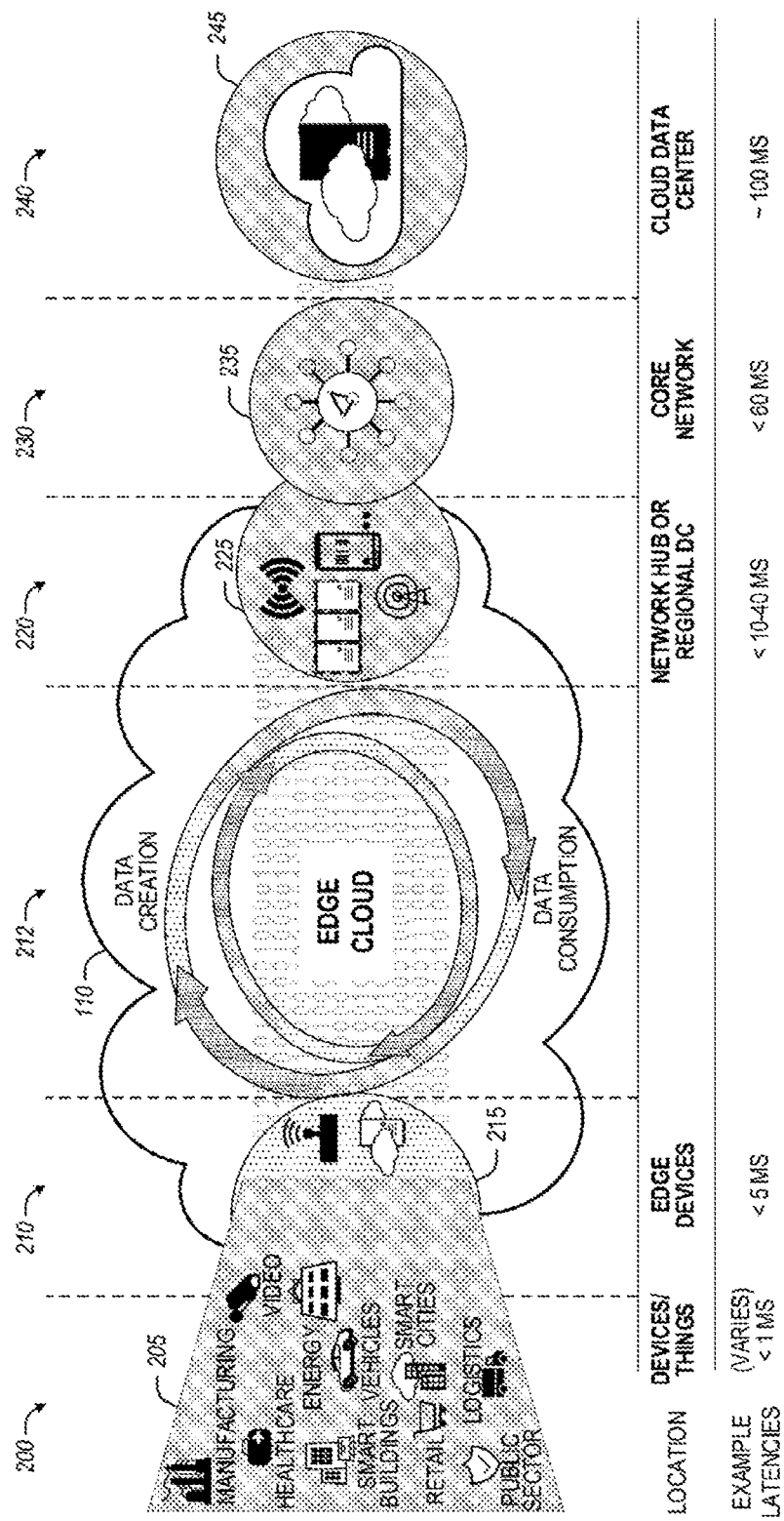
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted. Any of the communication use cases 205 can be configured based on RCF 111, which may be (1) performed by a communication node configured as an orchestration management entity within a MEC network (e.g., the orchestration management entity using the RCF for automated node configuration tuning of a plurality of nodes), or (2) performed by a board management controller (BMC) of a computing node (e.g., for automated node configuration tuning of the same computing node).

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network layer 230 and cloud data center layer 240, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, a number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of (a) Priority (throughput or latency; also referred to as service level objective or SLO) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, whereas some other input streams may tolerate an occasional failure, depending on the application); and (c) Physical constraints (e.g., power, cooling, and form-factor).

The end-to-end service view for these use cases involves the concept of a service flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real-time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing come the following caveats. The devices located at the edge are often resource-constrained and therefore there is pressure on the usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permission access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from the client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, the cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or another thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources that are proximately located to radio access network (RAN) capable endpoint devices (e.g., mobile computing devices, IoT devices, smart devices, etc.), which are discussed herein. In other words, the edge cloud 110 may be envisioned as an "edge" that connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing device. For example, the edge cloud 110 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect the contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein, and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent of other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIGS. 8A-8C. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code, or scripts may execute while being isolated from one or more other applications, software, code, or scripts.

Figure 3:
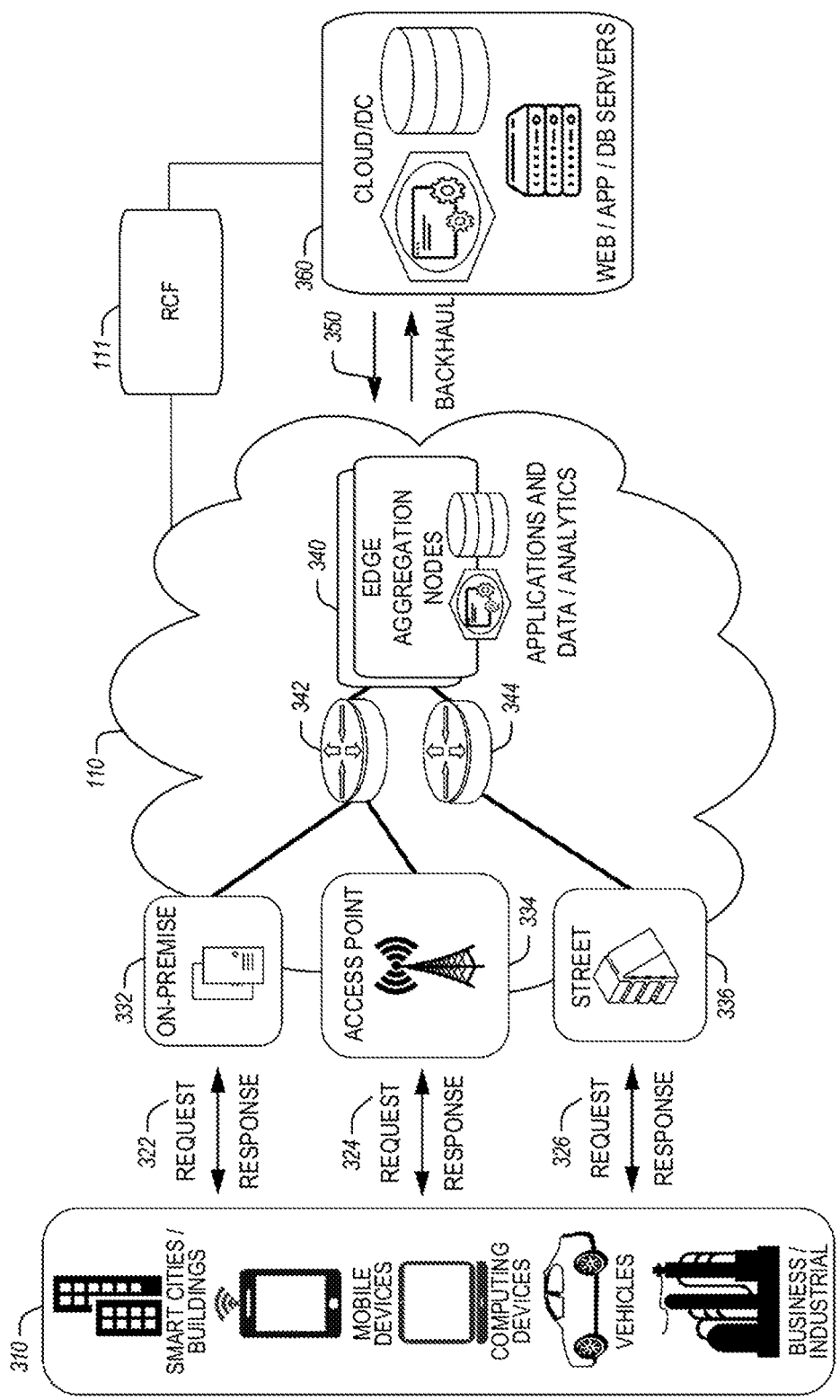
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

In an example embodiment, the edge cloud 110 and the cloud or data center 360 utilize RCF 111 in connection with disclosed techniques. The RCF 111 may be (1) performed by a communication node configured as an orchestration management entity within a MEC network (e.g., the orchestration management entity using the RCF for automated node configuration tuning of a plurality of nodes), or (2) performed by a board management controller (BMC) of a computing node (e.g., for automated node configuration tuning of the same computing node), as discussed in connection with FIG. 9-FIG. 14.

Figure 4:
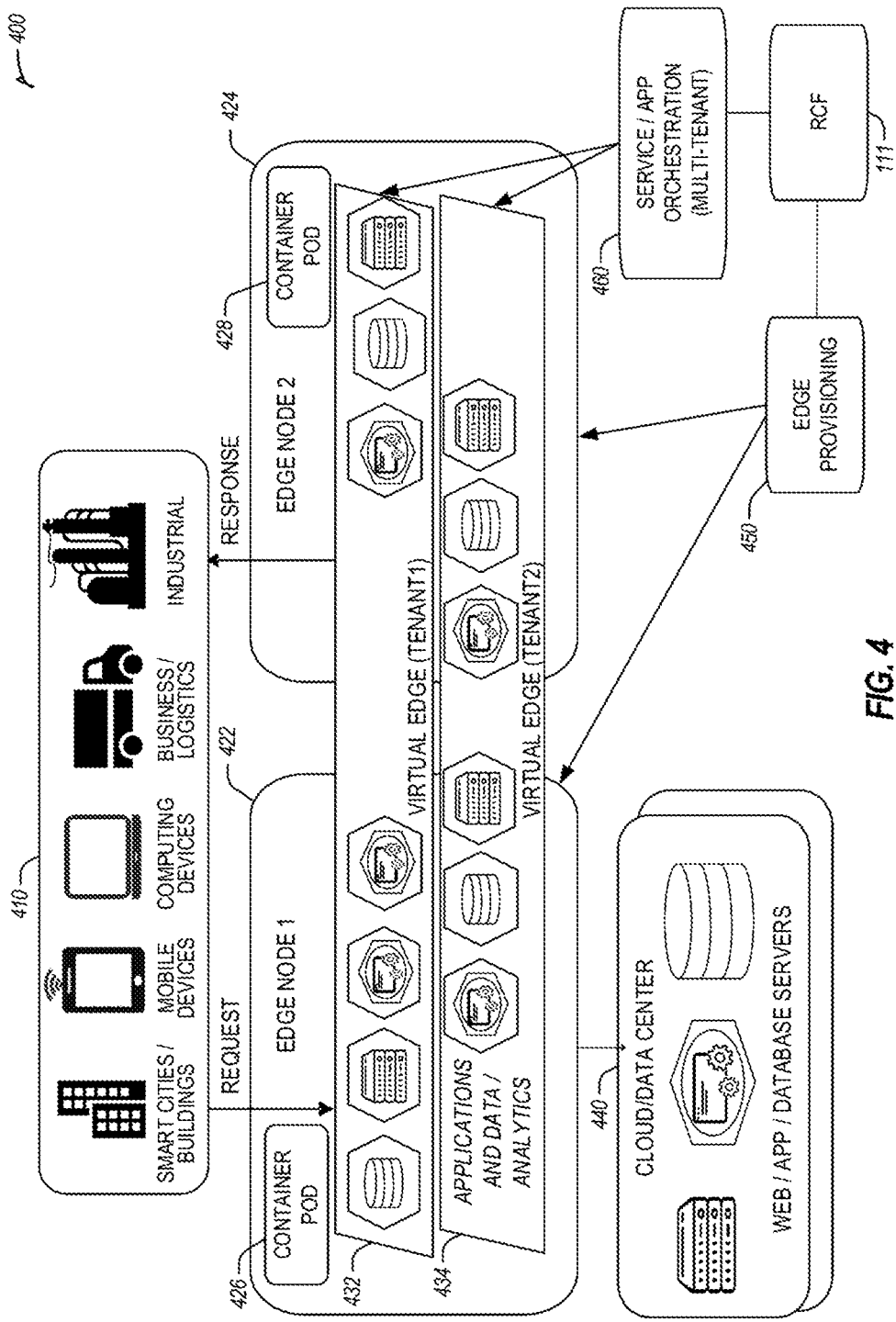
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts the coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 (or virtual edges) provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers the first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

In an example embodiment, the edge provisioning functions 450 and the orchestration functions 460 can utilize RCF 111 in connection with disclosed techniques. The RCF 111 may be (1) performed by a communication node configured as an orchestration management entity within a MEC network (e.g., the orchestration management entity using the RCF for automated node configuration tuning of a plurality of nodes), or (2) performed by a board management controller (BMC) of a computing node (e.g., for automated node configuration tuning of the same computing node), as discussed in connection with FIG. 9-FIG. 14.

It should be understood that some of the devices in the various client endpoints 410 are multi-tenant devices where Tenant 1 may function within a tenant1 'slice' while Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant-specific cryptographic key such that the combination of key and slice may be considered a "root of trust" (RoT) or tenant-specific RoT. An RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in virtual edge instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshaling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain an RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support an RoT context for each. Accordingly, the respective RoTs spanning devices in 410, 422, and 440 may coordinate the establishment of a distributed trusted computing base (DTCB) such that a tenant-specific virtual trusted secure channel linking all elements end to end can be established.

Further, it will be understood that a container may have data or workload-specific keys protecting its content from a previous edge node. As part of the migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container-specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency-sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices of virtual edges 432, 434 are partitioned according to the needs of each container.

With the use of container pods, a pod controller oversees the partitioning and allocation of containers and resources. The pod controller receives instructions from an orchestrator (e.g., performing orchestration functions 460) that instructs the controller on how best to partition physical resources and for what duration, such as by receiving key performance indicator (KPI) targets based on SLA contracts. The pod controller determines which container requires which resources and for how long to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents the assignment of resources until the right tenant authenticates or prevents provisioning of data or a workload to a container until an attestation result is satisfied.

Also, with the use of container pods, tenant boundaries can still exist but in the context of each pod of containers. If each tenant-specific pod has a tenant-specific pod controller, there will be a shared pod controller that consolidates resource allocation requests to avoid typical resource starvation situations. Further controls may be provided to ensure the attestation and trustworthiness of the pod and pod controller. For instance, the orchestration functions 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked before the second pod executing.

Figure 5:
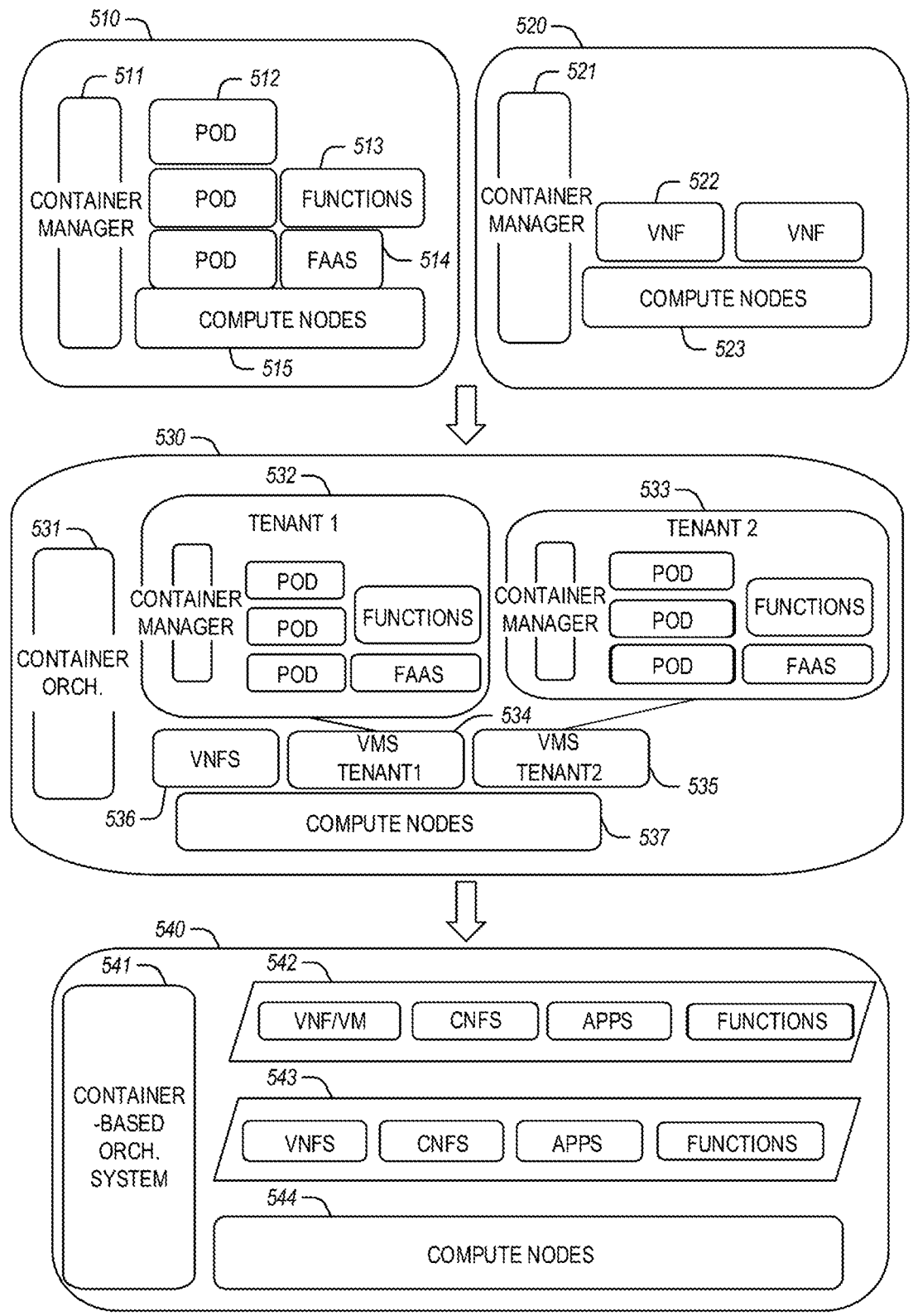
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (e.g., compute nodes 515 in arrangement 510) or to separately execute containerized virtualized network functions through execution via compute nodes (e.g., compute nodes 523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside from the execution of virtualized network functions). This arrangement is further adapted for use in system arrangement 540, which provides containers 542, 543, or execution of the various functions, applications, and functions on compute nodes 544, as coordinated by a container-based orchestration system 541.

The system arrangements depicted in FIG. 5 provide an architecture that treats VMs, Containers, and Functions equally in terms of application composition (and resulting applications are combinations of these three ingredients). Each ingredient may involve the use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves, and hardware partitioning schemes may be used by edge owners to enforce tenancy. Other isolation environments may include bare metal (dedicated) equipment, virtual machines, containers, virtual machines on containers, or combinations thereof.

In further examples, aspects of software-defined or controlled silicon hardware, and other configurable hardware, may integrate with the applications, functions, and services of an edge computing system. Software-defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
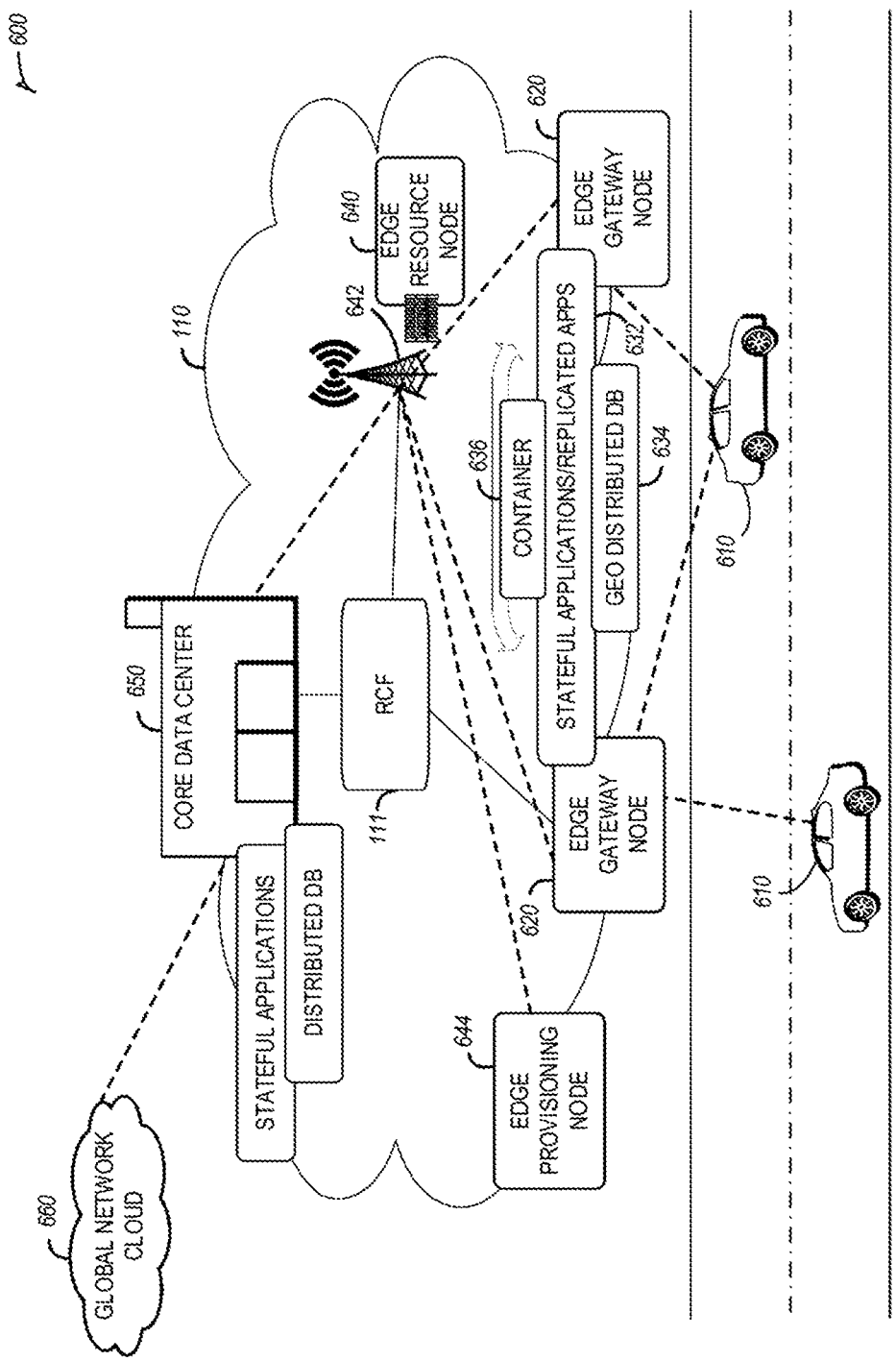
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles that communicate with the edge gateway nodes (or devices) 620 during traversal of a roadway. For instance, the edge gateway nodes 620 may be located in a roadside cabinet or other enclosure built into a structure having other, separate, mechanical utility, which may be placed along the roadway, at intersections of the roadway, or other locations near the roadway. As respective vehicles traverse along the roadway, the connection between its client compute node 610 and a particular edge gateway node 620 may propagate to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway nodes 620 include an amount of processing and storage capabilities and, as such, some processing and/or storage of data for the client compute nodes 610 may be performed on one or more of the edge gateway nodes 620.

The edge gateway devices 620 may communicate with one or more edge resource nodes 640, which are illustratively embodied as compute servers, appliances, or components located at or in a communication base station 642 (e.g., a base station of a cellular network). As discussed above, the respective edge resource nodes 640 include an amount of processing and storage capabilities, and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location, or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicates with the core data center 650, which may include compute servers, appliances, and/or other components located in a central location (e.g., a central office of a cellular communication network). The core data center 650 may provide a gateway to the global network cloud 660 (e.g., the Internet)

for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, a prediction can be made to identify the next owner to continue, or when the data or computational access will no longer be viable. These and other services may be utilized to complete the work that is needed to keep the transaction compliant and lossless.

In further scenarios, a container 636 (or a pod of containers) may be flexibly migrated from an edge node 620 to other edge nodes (e.g., 620, 640, etc.) such that the container with an application and workload does not need to be reconstituted, re-compiled, re-interpreted for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container-native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile units, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In an example embodiment, the edge cloud 110 in FIG. 6 utilizes RCF 111 in connection with disclosed techniques. The RCF 111 may be (1) performed by a communication node configured as an orchestration management entity within a MEC network (e.g., the orchestration management entity using the RCF for automated node configuration tuning of a plurality of nodes), or (2) performed by a board management controller (BMC) of a computing node (e.g., for automated node configuration tuning of the same computing node), as discussed in connection with FIG. 9-FIG. 14.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application that may be provided by a third party) is executed. The container may be any isolated execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer-readable (also referred to as machine-readable) instructions 882 of FIG. 8B, to various receiving parties for implementing any of the methods described herein. The example edge provisioning node 644 may be implemented by any computer server, home server, content delivery network, virtual server, software distribution system, central facility, storage device, storage disks, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer-readable instructions 882 (also referred to as machine-readable instructions 882) of FIG. 8B. The receiving parties may be consumers, service providers, users, retailers, OEMs, etc., who purchase and/or license the software instructions for use and/or re-sale and/or sub-licensing.

In an example, the edge provisioning node 644 includes one or more servers and one or more storage devices/disks. The storage devices and/or storage disks host computer-readable instructions such as the example computer-readable instructions 882 of FIG. 8B, as described below. Similar to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer-readable instructions 882 from the edge provisioning node 644. For example, the software instructions, which may correspond to the example computer-readable instructions 882 of FIG. 8B may be downloaded to the example processor platform/s, which is to execute the computer-readable instructions 882 to implement the methods described herein.

In some examples, the processor platform(s) that execute the computer-readable instructions 882 can be physically located in different geographic locations, legal jurisdictions, etc. In some examples, one or more servers of the edge provisioning node 644 periodically offer, transmit, and/or force updates to the software instructions (e.g., the example computer-readable instructions 882 of FIG. 8B) to ensure improvements, patches, updates, etc. are distributed and applied to the software instructions implemented at the end-user devices. In some examples, different components of the computer-readable instructions 882 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

Figure 7:
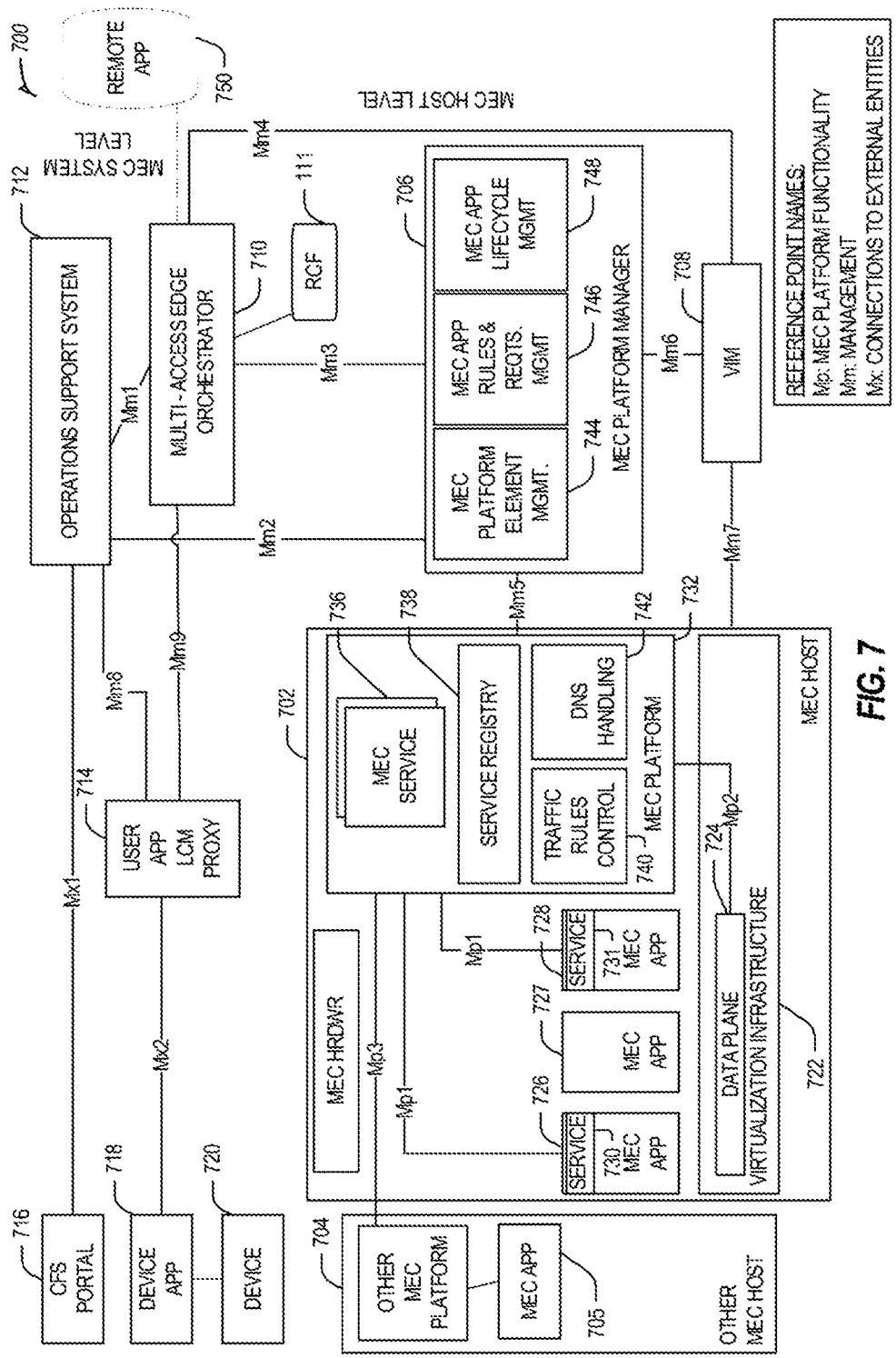
FIG. 7 illustrates an example mobile edge system reference architecture, arranged according to an ETSI Multi-Access Edge Computing (MEC) specification.

FIG. 7 illustrates a mobile edge system reference architecture (or MEC architecture) 700, such as is indicated by ETSI MEC specifications. FIG. 7 specifically illustrates a MEC architecture 700 with MEC hosts 702 and 704 providing functionalities in accordance with the ETSI GS MEC-003 specification. In some aspects, enhancements to the MEC platform 732 and the MEC platform manager 706 may be used for providing specific computing functions within the MEC architecture 700.

Referring to FIG. 7, the MEC network architecture 700 can include MEC hosts 702 and 704, a virtualization infrastructure manager (VIM) 708, a MEC platform manager 706, a MEC orchestrator 710, an operations support system 712, a user app proxy 714, a UE app 718 running on UE 720, and CFS portal 716. The MEC host 702 can include a MEC platform 732 with filtering rules control component 740, a DNS handling component 742, a service registry 738, and MEC services 736. The MEC services 736 can include at least one scheduler, which can be used to select resources for instantiating MEC apps (or NFVs) 726, 727, and 728 upon virtualization infrastructure 722. The MEC apps 726 and 728 can be configured to provide services 730 and 731, which can include processing network communications traffic of different types associated with one or more wireless connections (e.g., connections to one or more RAN or telecom-core network entities). The MEC app 705 instantiated within MEC host 704 can be similar to the MEC apps 726-728 instantiated within MEC host 702. The virtualization infrastructure 722 includes a data plane 724 coupled to the MEC platform via an MP2 interface. Additional interfaces between various network entities of the MEC architecture 700 are illustrated in FIG. 7.

The MEC platform manager 706 can include MEC platform element management component 744, MEC app rules and requirements management component 746, and MEC app lifecycle management component 748. The various entities within the MEC architecture 700 can perform functionalities as disclosed by the ETSI GS MEC-003 specification.

In some aspects, the remote application (or app) 750 is configured to communicate with the MEC host 702 (e.g., with the MEC apps 726-728) via the MEC orchestrator 710 and the MEC platform manager 706.

In some embodiments, the MEC orchestrator 710 may be configured with RCF 111. Additionally, the remote app 750 may be used for configuring one or more settings associated with the RCF 111 (e.g., using as an administrative interface for policy/SLO and resource mapping registration).

In further examples, any of the compute nodes or devices discussed with reference to the present edge computing systems and environment may be fulfilled based on the components depicted in FIGS. 8A and 8B. Respective edge compute nodes may be embodied as a type of device, appliance, computer, or other "thing" capable of communicating with other edges, networking, or endpoint components. For example, an edge compute device may be embodied as a personal computer, a server, a smartphone, a mobile compute device, a smart appliance, an in-vehicle compute system (e.g., a navigation system), a self-contained device having an outer case, shell, etc., or other device or system capable of performing the described functions.

Figure 8A:
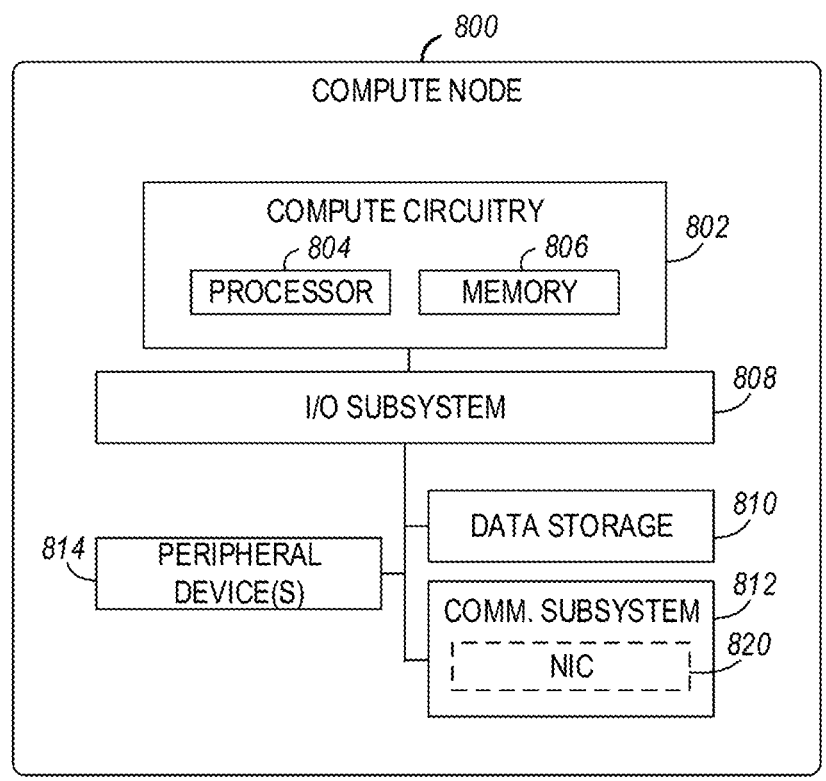
FIG. 8A provides an overview of example components for compute deployed at a compute node in an edge computing system.

In the simplified example depicted in FIG. 8A, an edge compute node 800 includes a compute engine (also referred to herein as "compute circuitry") 802, an input/output (I/O) subsystem 808, one or more data storage devices 810, a communication circuitry subsystem 812, and, optionally, one or more peripheral devices 814. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 800 may be embodied as any type of engine, device, or collection of devices capable of performing various compute functions. In some examples, the compute node 800 may be embodied as a single device such as an integrated circuit, an embedded system, a field-programmable gate array (FPGA), a system-on-a-chip (SOC), or other integrated system or device. In the illustrative example, the compute node 800 includes or is embodied as a processor 804 and a memory 806. The processor 804 may be embodied as any type of processor capable of performing the functions described herein (e.g., executing an application). For example, the processor 804 may be embodied as a multi-core processor(s), a microcontroller, a processing unit, a specialized or special purpose processing unit, or another processor or processing/controlling circuit.

In some examples, the processor 804 may be embodied as, include, or be coupled to an FPGA, an application-specific integrated circuit (ASIC), reconfigurable hardware or hardware circuitry, or other specialized hardware to facilitate the performance of the functions described herein. Also in some examples, the processor 804 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within a SOC or integrated with networking circuitry (e.g., in a SmartNIC, or enhanced SmartNIC), acceleration circuitry, storage devices, or AI hardware (e.g., GPUs, programmed FPGAs, Network Processing Units (NPUs), Infrastructure Processing Units (IPUs), Storage Processing Units (SPUs), AI Processors (APUs), Data Processing Unit (DPUs), or other specialized accelerators such as a cryptographic processing unit/accelerator). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general-purpose processing hardware. However, it will be understood that an xPU, a SOC, a CPU, and other variations of the processor 804 may work in coordination with each other to execute many types of operations and instructions within and on behalf of the compute node 800.

The memory 806 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three-dimensional crosspoint memory device (e.g., Intel® 3D XPoint™ memory), or other byte-addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the memory 806 may be integrated into the processor 804. The memory 806 may store various software and data used during operation such as one or more applications, data operated on by the application(s), libraries, and drivers.

The compute circuitry 802 is communicatively coupled to other components of the compute node 800 via the I/O subsystem 808, which may be embodied as circuitry and/or components to facilitate input/output operations with the compute circuitry 802 (e.g., with the processor 804 and/or the main memory 806) and other components of the compute circuitry 802. For example, the I/O subsystem 808 may be embodied as, or otherwise include memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 808 may form a portion of a system-on-a-chip (SoC) and be incorporated, along with one or more of the processor 804, the memory 806, and other components of the compute circuitry 802, into the compute circuitry 802.

The one or more illustrative data storage devices 810 may be embodied as any type of device configured for short-term or long-term storage of data such as, for example, memory devices and circuits, memory cards, hard disk drives, solid-state drives, or other data storage devices. Individual data storage devices may include a system partition that stores data and firmware code for the one or more data storage devices 810. Individual data storage devices of the one or more data storage devices 810 may also include one or more operating system partitions that store data files and executables for operating systems depending on, for example, the type of compute node 800.

The communication circuitry subsystem 812 may be embodied as any communication circuit, device, or collection thereof, capable of enabling communications over a network between the compute circuitry 802 and another compute device (e.g., an edge gateway of an implementing edge computing system). The communication circuitry subsystem 812 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, low-power wide-area network (LP-WAN) or low-power wide-area (LPWA) protocols, etc.) to effect such communication.

The illustrative communication circuitry subsystem 812 includes a network interface controller (NIC) 820, which may also be referred to as a host fabric interface (HFI). The NIC 820 may be embodied as one or more add-in-boards, daughter cards, network interface cards, controller chips, chipsets, or other devices that may be used by the compute node 800 to connect with another compute device (e.g., an edge gateway node). In some examples, the NIC 820 may be embodied as part of a system-on-a-chip (SoC) that includes one or more processors or included on a multichip package that also contains one or more processors. In some examples, the NIC 820 may include a local processor (not shown) and/or a local memory (not shown) that are both local to the NIC 820. In such examples, the local processor of the NIC 820 may be capable of performing one or more of the functions of the compute circuitry 802 described herein. Additionally, or in such examples, the local memory of the NIC 820 may be integrated into one or more components of the client compute node at the board level, socket level, chip level, and/or other levels.

Additionally, in some examples, a respective compute node 800 may include one or more peripheral devices 814. Such peripheral devices 814 may include any type of peripheral device found in a compute device or server such as audio input devices, a display, other input/output devices, interface devices, and/or other peripheral devices, depending on the particular type of compute node 800. In further examples, the compute node 800 may be embodied by a respective edge compute node (whether a client, gateway, or aggregation node) in an edge computing system or like forms of appliances, computers, subsystems, circuitry, or other components.

Figure 8B:
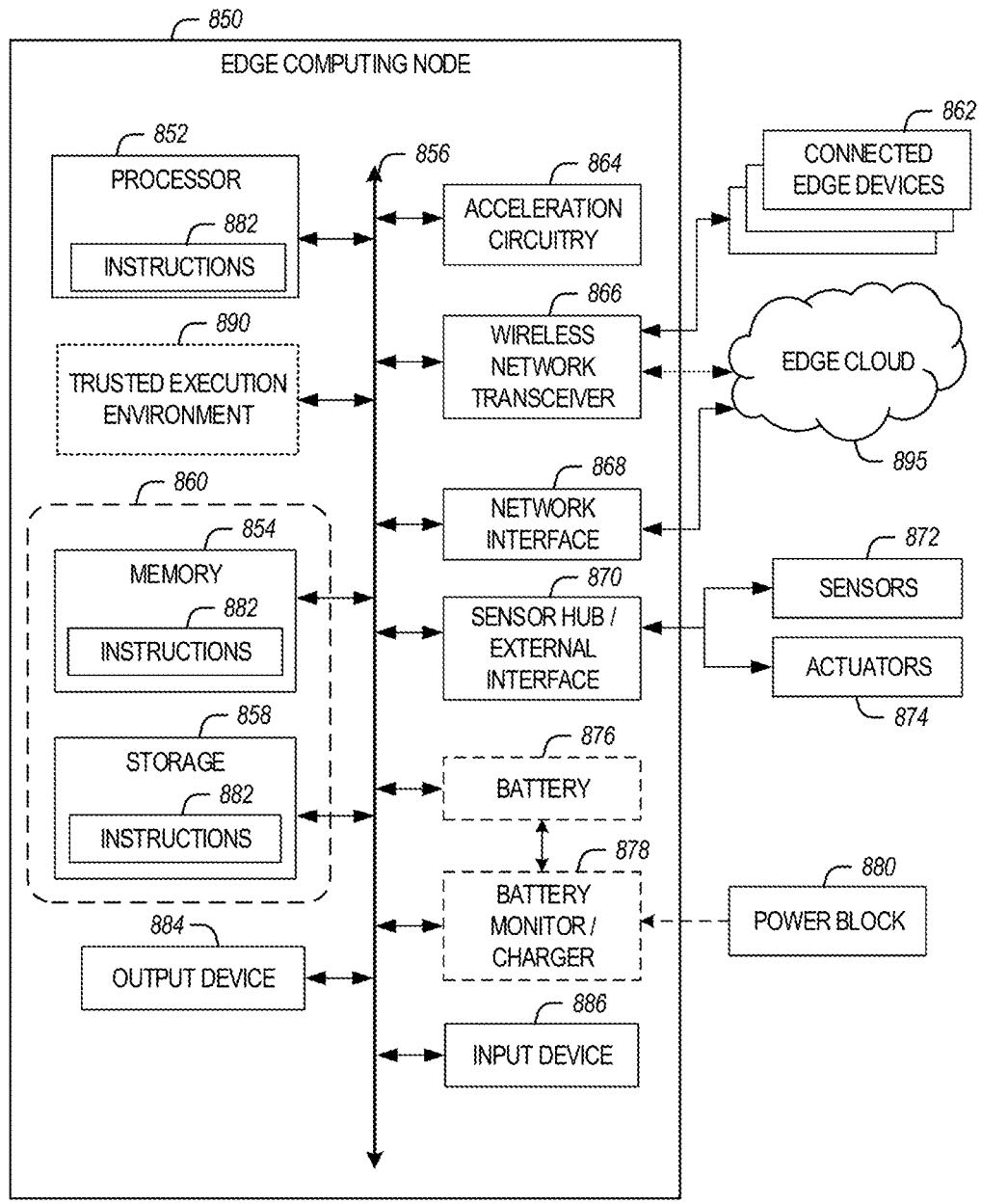
FIG. 8B provides a further overview of example components within a computing device in an edge computing system.

In a more detailed example, FIG. 8B illustrates a block diagram of an example of components that may be present in an edge computing node 850 for implementing the techniques (e.g., operations, processes, methods, and methodologies) described herein. This edge computing node 850 provides a closer view of the respective components of node 800 when implemented as or as part of a computing device (e.g., as a mobile device, a base station, server, gateway, etc.). The edge computing node 850 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 850, or as components otherwise incorporated within a chassis of a larger system.

The edge computing node 850 may include processing circuitry in the form of a processor 852, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 852 may be a part of a system on a chip (SoC) in which the processor 852 and other components are formed into a single integrated circuit, or a single package, such as the Edison™ or Galileo™ SoC boards from Intel Corporation, Santa Clara, California. As an example, the processor 852 may include an Intel® Architecture Core™ based CPU processor, such as a Quark™, an Atom™ an i3, an i5, an i7, an i9, or an MCU-class processor, or another such processor available from Intel®. However, any number of other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 852 and accompanying circuitry may be provided in a single socket form factor, multiple socket form factor, or a variety of other formats, including in limited hardware configurations or configurations that include fewer than all elements shown in FIG. 8B.

The processor 852 may communicate with a system memory 854 over an interconnect 856 (e.g., a bus). Any number of memory devices may be used to provide for a given amount of system memory. As an example, the memory 854 may be random access memory (RAM) per a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP), or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems, and so forth, a storage 858 may also couple to the processor 852 via the interconnect 856. In an example, storage 858 may be implemented via a solid-state disk drive (SSDD). Other devices that may be used for the storage 858 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low-power implementations, the storage 858 may be on-die memory or registers associated with the processor 852. However, in some examples, storage 858 may be implemented using a micro hard disk drive (HDD). Further, any number of new technologies may be used for the storage 858 in addition to, or instead of, the technologies described, such as resistance change memories, phase change memories, holographic memories, or chemical memories, among others.

The components may communicate over the interconnect 856. The interconnect 856 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in an SoC-based system. Other bus systems may be included, such as an Inter-Integrated Circuit (I2C) interface, a Serial Peripheral Interface (SPI) interface, point-to-point interfaces, and a power bus, among others.

The interconnect 856 may couple the processor 852 to a transceiver 866 (e.g., a wireless network transceiver), for communications with the connected edge devices 862. The transceiver 866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 862. For example, a wireless local area network (WLAN) unit may be used to implement Wi-Fi® communications under the Institute of Electrical and Electronics Engineers (IEEE) 802.11 standard. Also, wireless wide area communications, e.g., according to a cellular or other wireless wide area protocol, may occur via a wireless wide area network (WWAN) unit.

The wireless network transceiver 866 (or multiple transceivers) may communicate using multiple standards or radios for communications at a different range. For example, the edge computing node 850 may communicate with close devices, e.g., within about 10 meters, using a local transceiver based on Bluetooth Low Energy (BLE), or another low power radio, to save power. More distant connected edge devices 862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 866 (e.g., a radio transceiver) may be included to communicate with devices or services in the edge cloud 895 via local or wide area network protocols. The wireless network transceiver 866 may be a low-power wide-area (LPWA) transceiver that follows the IEEE 802.15.4, or IEEE 802.15.4g standards, among others. The edge computing node 850 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as timeslotted channel hopping, described in the IEEE 802.15.4e specification may be used.

Any number of other radio communications and protocols may be used in addition to the systems mentioned for the wireless network transceiver 866, as described herein. For example, the transceiver 866 may include a cellular transceiver that uses spread spectrum (SPA/SAS) communications for implementing high-speed communications. Further, any number of other protocols may be used, such as Wi-Fi® networks for medium-speed communications and provision of network communications. The transceiver 866 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 868 may be included to provide a wired communication to nodes of the edge cloud 895 or other devices, such as the connected edge devices 862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to enable connecting to a second network, for example, a first NIC 868 providing communications to the cloud over Ethernet, and a second NIC 868 providing communications to other devices over another type of network.

Given the variety of types of applicable communications from the device to another component or network, applicable communications circuitry used by the device may include or be embodied by any one or more of components 864, 866, 868, or 870. Accordingly, in various examples, applicable means for communicating (e.g., receiving, transmitting, etc.) may be embodied by such communications circuitry.

The edge computing node 850 may include or be coupled to acceleration circuitry 864, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 856 may couple the processor 852 to a sensor hub or external interface 870 that is used to connect additional devices or subsystems. The devices may include sensors 872, such as accelerometers, level sensors, flow sensors, optical light sensors, camera sensors, temperature sensors, global navigation system (e.g., GPS) sensors, pressure sensors, barometric pressure sensors, and the like. The sensor hub or external interface 870 further may be used to connect the edge computing node 850 to actuators 874, such as power switches, valve actuators, an audible sound generator, a visual warning device, and the like.

In some optional examples, various input/output (I/O) devices may be present within or connected to, the edge computing node 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 850. A display or console hardware, in the context of the present system, may be used to provide output and receive input of an edge computing system; to manage components or services of an edge computing system; identify a state of an edge computing component or service, or to conduct any other number of management or administration functions or service use cases.

A battery 876 may power the edge computing node 850, although, in examples in which the edge computing node 850 is mounted in a fixed location, it may have a power supply coupled to an electrical grid, or the battery may be used as a backup or for temporary capabilities. The battery 876 may be a lithium-ion battery, or a metal-air battery, such as a zinc-air battery, an aluminum-air battery, a lithium-air battery, and the like.

A battery monitor/charger 878 may be included in the edge computing node 850 to track the state of charge (SoCh) of the battery 876, if included. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 878 may communicate the information on the battery 876 to the processor 852 over the interconnect 856. The battery monitor/charger 878 may also include an analog-to-digital (ADC) converter that enables the processor 852 to directly monitor the voltage of the battery 876 or the current flow from the battery 876. The battery parameters may be used to determine actions that the edge computing node 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the edge computing node 850. A wireless battery charging circuit, such as an LTC4020 chip from Linear Technologies of Milpitas, California, among others, may be included in the battery monitor/charger 878. The specific charging circuits may be selected based on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application-specific integrated circuit (ASIC).

Also in a specific example, the instructions 882 on the processor 852 (separately, or in combination with the instructions 882 of the machine-readable medium 860) may configure execution or operation of a trusted execution environment (TEE) 890. In an example, the TEE 890 operates as a protected area accessible to the processor 852 for secure execution of instructions and secure access to data. Various implementations of the TEE 890, and an accompanying secure area in the processor 852 or the memory 854 may be provided, for instance, through the use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in device 850 through the TEE 890 and the processor 852.

In an example, the instructions 882 provided via memory 854, the storage 858, or the processor 852 may be embodied as a non-transitory, machine-readable medium 860 including code to direct the processor 852 to perform electronic operations in the edge computing node 850. The processor 852 may access the non-transitory, machine-readable medium 860 over the interconnect 856. For instance, the non-transitory, machine-readable medium 860 may be embodied by devices described for the storage 858 or may include specific storage units such as optical disks, flash drives, or any number of other hardware devices. The non-transitory, machine-readable medium 860 may include instructions to direct the processor 852 to perform a specific sequence or flow of actions, for example, as described with respect to the flowchart(s) and block diagram(s) of operations and functionality depicted above. As used herein, the terms "machine-readable medium", "computer-readable medium", "machine-readable storage", and "computer-readable storage" are interchangeable.

In further examples, a machine-readable medium also includes any tangible medium that is capable of storing, encoding, or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of several transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 8C:
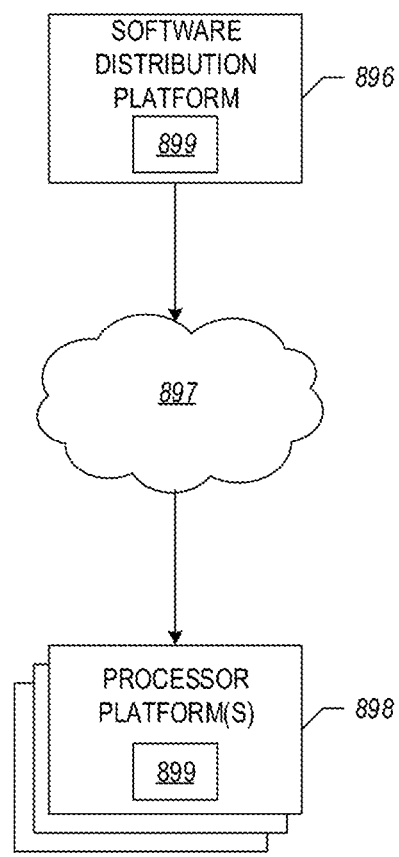
FIG. 8C illustrates a software distribution platform, according to some embodiments.

FIG. 8C illustrates an example software distribution platform 896 to distribute software, such as the example computer-readable instructions 899, to one or more devices, such as processor platform(s) 898 and/or example connected edge devices 862 of FIG. 8B. The example software distribution platform 896 may be implemented by any computer server, data facility, cloud service, etc., capable of storing and transmitting software to other computing devices (e.g., third parties, the example connected edge devices 862 of FIG. 8B). Example connected edge devices may be customers, clients, managing devices (e.g., servers), third parties (e.g., customers of an entity owning and/or operating the software distribution platform 896). Example connected edge devices may operate in commercial and/or home automation environments. In some examples, a third party is a developer, a seller, and/or a licensor of software such as the example computer-readable instructions 899. The third parties may be consumers, users, retailers, OEMs, etc. that purchase and/or license the software for use and/or re-sale and/or sub-licensing. In some examples, distributed software causes the display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 8C, the software distribution platform 896 includes one or more servers and one or more storage devices. The storage devices store the computer-readable instructions 899, which may correspond to the example computer-readable instructions 882 of FIG. 8B, as described above. The one or more servers of the example software distribution platform 896 are in communication with a network 897, which may correspond to any one or more of the Internet and/or any of the example networks described herein. In some examples, the one or more servers are responsive to requests to transmit the software to a requesting party as part of a commercial transaction. Payment for the delivery, sale, and/or license of the software may be handled by the one or more servers of the software distribution platform and/or via a third-party payment entity. The servers enable purchasers and/or licensors to download the computer-readable instructions 899 from the software distribution platform 896. For example, the software, which may correspond to the example computer-readable instructions 882 of FIG. 8B, may be downloaded to the example processor platform(s) 898 (e.g., example connected edge devices), which is/are to execute the computer-readable instructions 899 to implement the techniques discussed herein. In some examples, one or more servers of the software distribution platform 896 are communicatively connected to one or more security domains and/or security devices through which requests and transmissions of the example computer-readable instructions 899 must pass. In some examples, one or more servers of the software distribution platform 896 periodically offer, transmit, and/or force updates to the software (e.g., the example computer-readable instructions 882 of FIG. 8B which can be the same as the computer-readable instructions 899) to ensure improvements, patches, updates, etc. are distributed and applied to the software at the end-user devices.

In the illustrated example of FIG. 8C, the computer-readable instructions 899 are stored on storage devices of the software distribution platform 896 in a particular format. A format of computer-readable instructions includes, but is not limited to a particular code language (e.g., Java, JavaScript, Python, C, C #, SQL, HTML, etc.), and/or a particular code state (e.g., uncompiled code (e.g., ASCII), interpreted code, linked code, executable code (e.g., a binary), etc.). In some examples, the computer-readable instructions 899 stored in the software distribution platform 896 are in a first format when transmitted to the example processor platform(s) 896. In some examples, the first format is an executable binary in which particular types of the processor platform(s) 898 can execute. However, in some examples, the first format is uncompiled code that requires one or more preparation tasks to transform the first format to a second format to enable execution on the example processor platform(s) 898. For instance, the receiving processor platform(s) 898 may need to compile the computer-readable instructions 899 in the first format to generate executable code in a second format that is capable of being executed on the processor platform(s) 898. In still other examples, the first format is interpreted code that, upon reaching the processor platform(s) 898, is interpreted by an interpreter to facilitate the execution of instructions.

Figure 9:
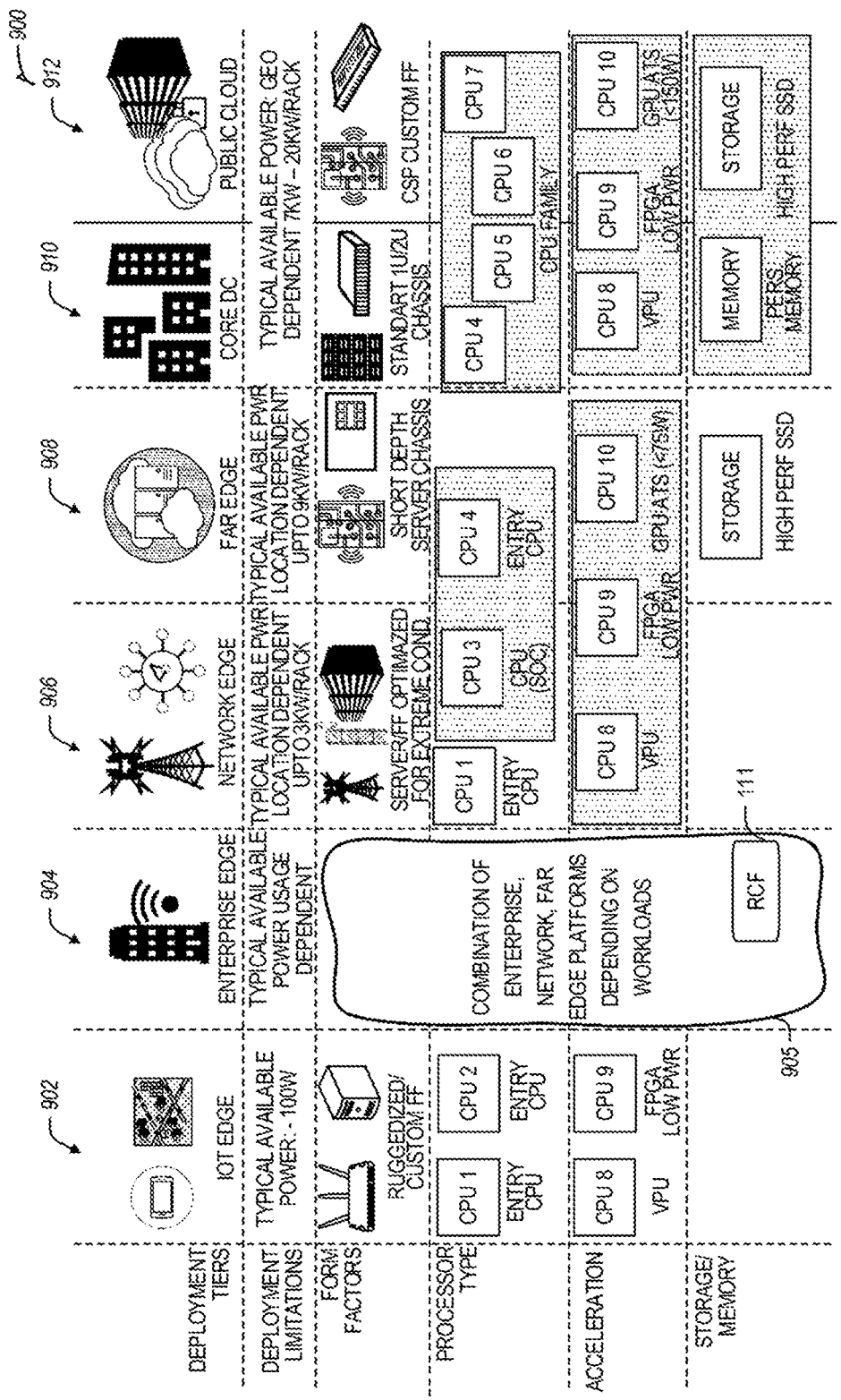
FIG. 9 illustrates different hardware deployment tiers which can be configured with a resource configuration function (RCF), according to an example embodiment.

FIG. 9 illustrates different hardware deployment tiers which can be configured with a resource configuration function (RCF), according to an example embodiment. Referring to FIG. 9, the computing infrastructure 900 includes different deployment tiers, such as IoT edge tier 902, enterprise edge tier 904, network edge tier 906, far edge tier 908, a core data center (DC) tier 910, and a public cloud tier 912. The computing infrastructure 900 may span across tiers 902-912, with different compute deployment limitations, processor types, deployed processor acceleration characteristics, deployed processor acceleration characteristics, and storage/memory configurations to support different usages and different cost, performance, and power constraints as illustrated in FIG. 9. The deployed configurations in the computing infrastructure 900 host varying types of platforms, power management, and computing technologies. Additionally, different service usages result in a large multiplicity of demand patterns, congestion points, and expectations in the form of SLOs.

Figure 10:
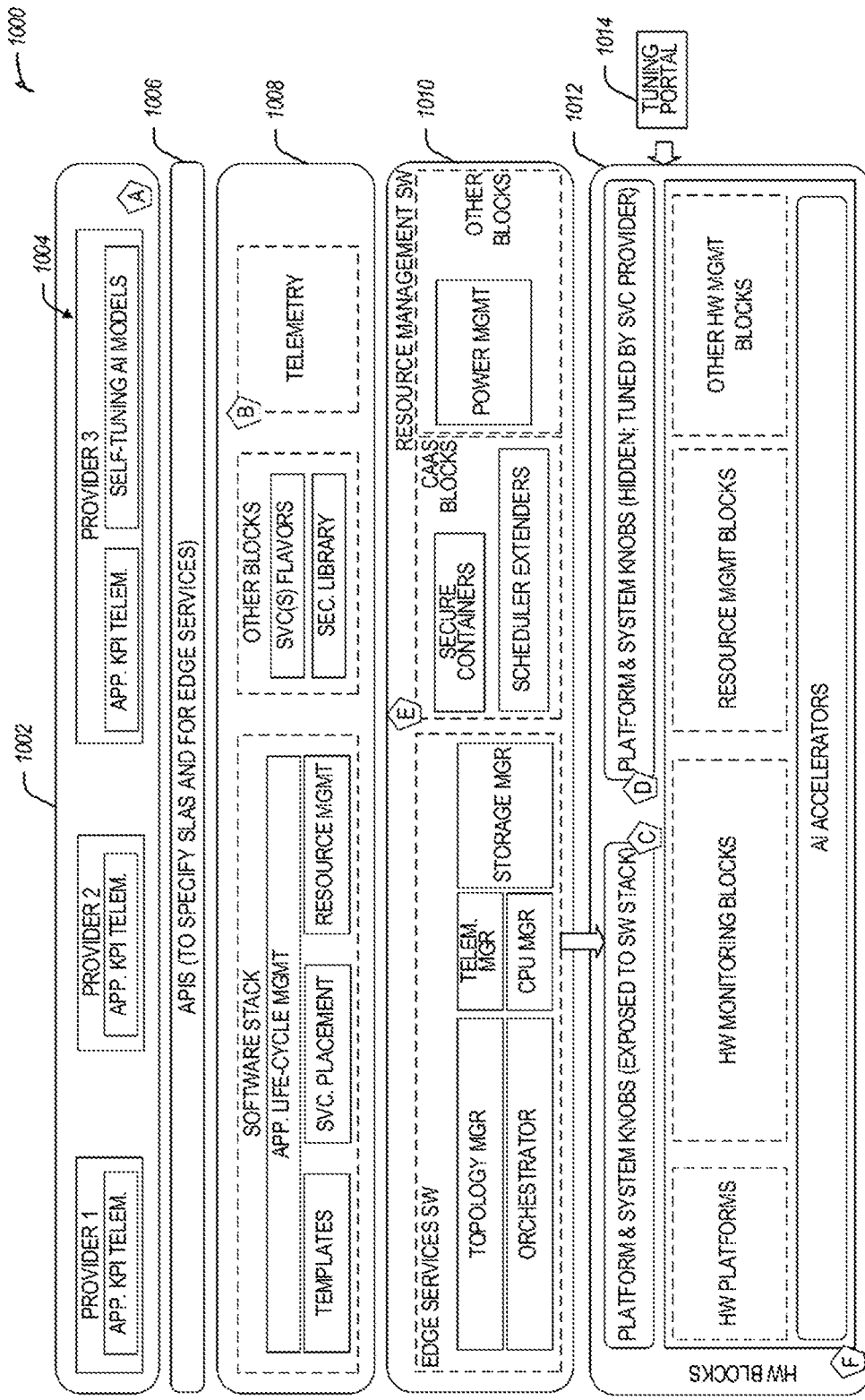
FIG. 10 illustrates a resource configuration architecture, according to some embodiments.
Figure 13:
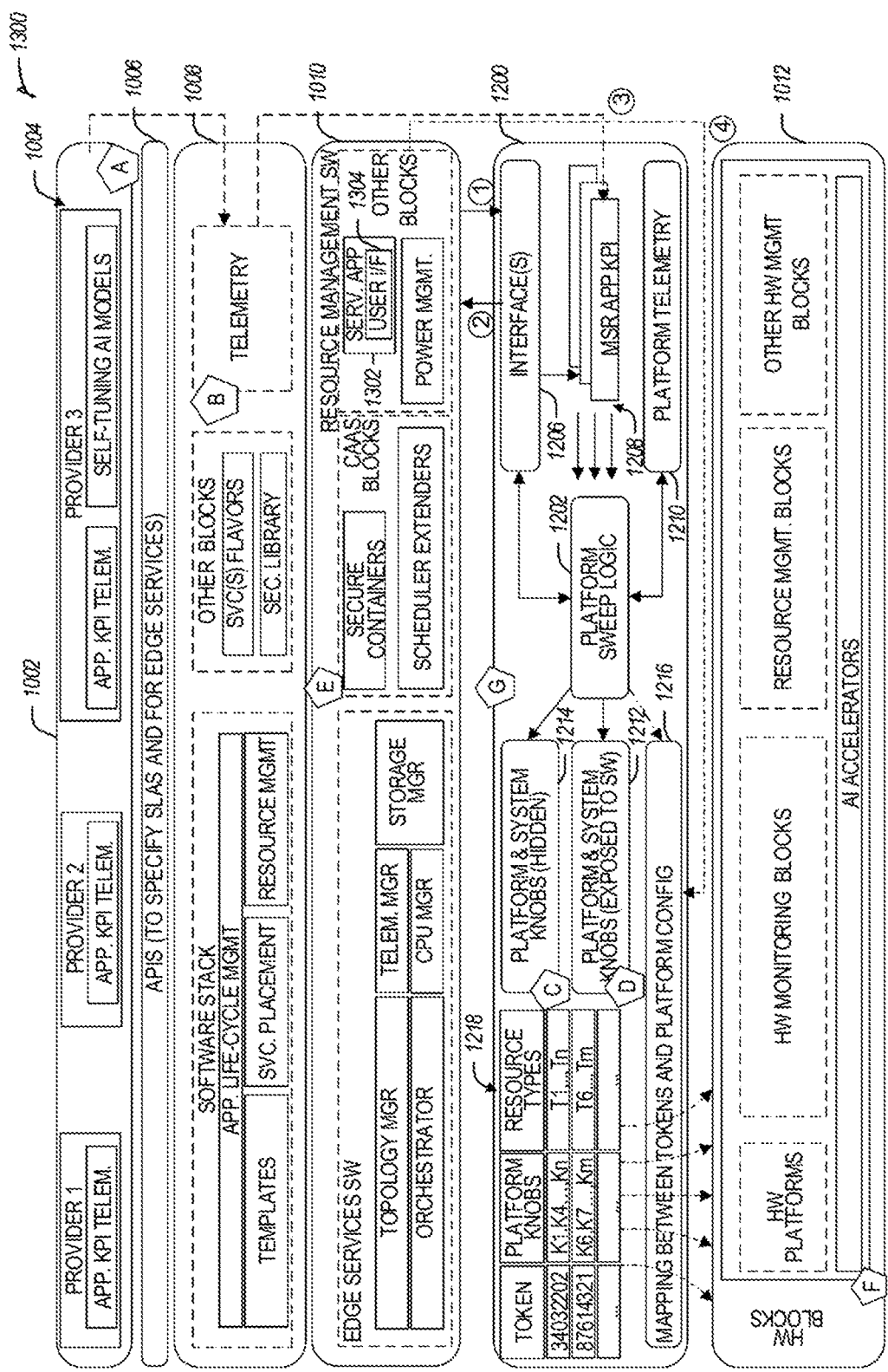
FIG. 13 illustrates the resource configuration architecture of FIG. 10 configured with a resource configuration component performing RCFs, according to some embodiments.
Figure 14:
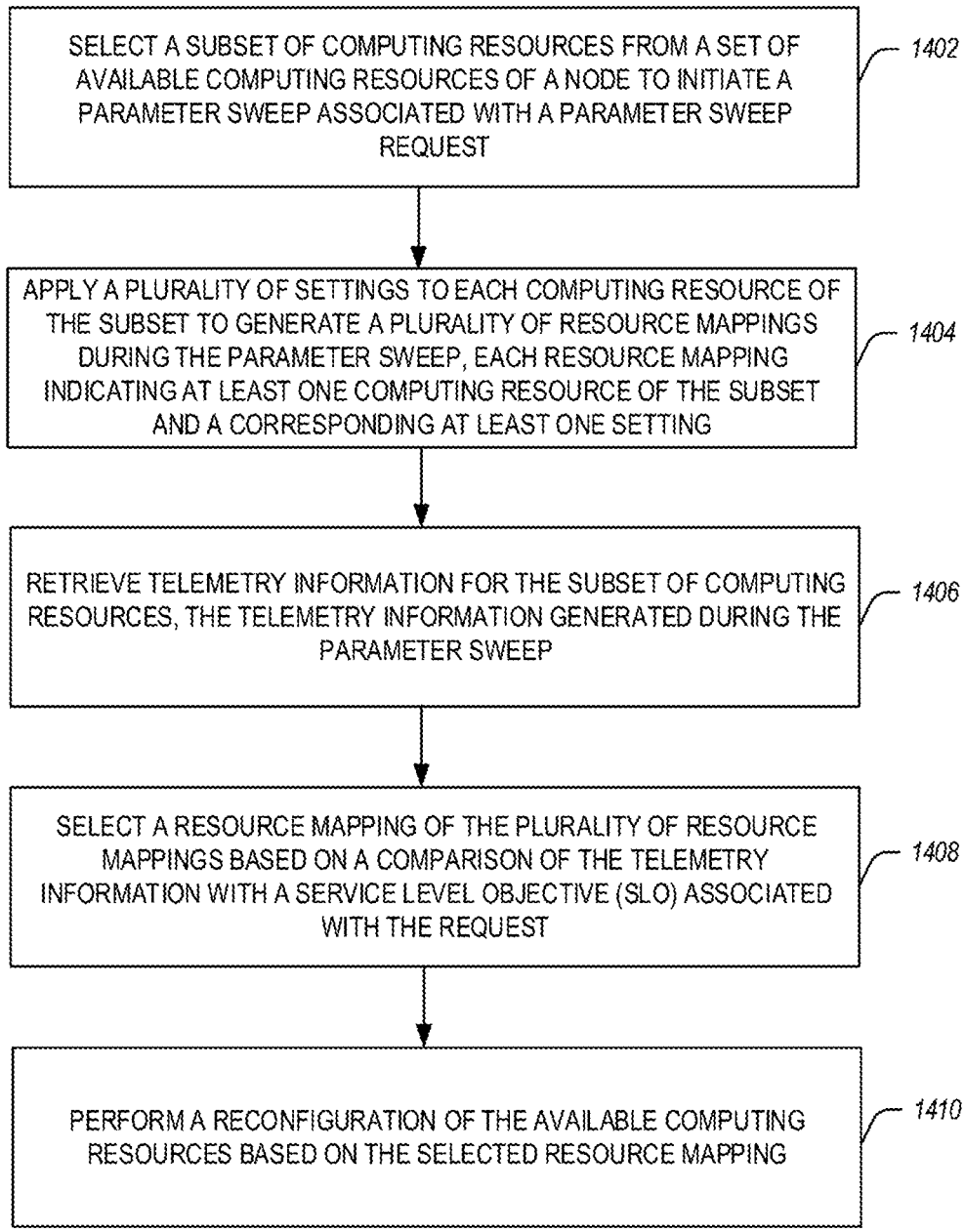
FIG. 14 illustrates a flowchart of a method for resource configuration in an edge system, according to an example embodiment.

In an example embodiment, one or more compute platforms from the deployment tiers 902-912 (e.g., the enterprise, network, and far edge tiers) form a MEC network (or an edge system) 905 implementing RCF 111 in connection with disclosed techniques. The RCF 111 may be (1) performed by a communication node configured as an orchestration management entity within a MEC network (e.g., the orchestration management entity using the RCF for automated node configuration tuning of a plurality of nodes), or (2) performed by a board management controller (BMC) of a computing node (e.g., for automated node configuration tuning of the same computing node). An example resource configuration architecture that may utilize the disclosed RCF 111 is illustrated in FIG. 10. A more detailed description of the RCF and a resource configuration component performing the RCF is provided in connection with FIG. 11 and FIG. 12. FIG. 13 illustrates the example resource configuration architecture of FIG. 10 configured with the resource configuration component performing the RCF. FIG. 14 illustrates an example method for resource management that can be performed by the disclosed resource configuration component.

FIG. 10 illustrates a resource configuration architecture 1000, according to some embodiments. Referring to FIG. 10, the resource configuration architecture 1000 may be implemented as part of a computing node in a MEC network and may include telemetry applications component 1002, APIs 1006, a software stack 1008, a resource management software component 1010, and a hardware stack 1012. The telemetry applications component 1002 (also referred to as application telemetry and indicated as module A in FIG. 10) includes a plurality of telemetry generation modules 1004 which can be configured telemetry information such as application key performance indicators (KPI) telemetry used for reconfiguration of available computing resources in connection with the disclosed techniques. APIs 1006 include interfaces used for specifying service level objectives (SLOs) or other configurations associated with the RCF (e.g., configuring resource mappings used during the RCF as discussed in connection with FIG. 11 and FIG. 12).

The software stack 1008 includes various software modules associated with application lifecycle management, application templates, resource management applications, and a telemetry processing module (also referred to as telemetry processing and indicated as module B in FIG. 10). The telemetry management module is configured to collect and provide telemetry information, such as telemetry information using the telemetry applications component 1002.

The resource management software component 1010 (also referred to as resource allocation and orchestration and indicated as module E in FIG. 10) includes edge services software (e.g., a typology manager, an orchestrator, a storage manager, a CPU manager, etc.), content as a service (CaaS) software (providing, e.g., secure containers functionality, scheduler extenders, etc.), and other functional software modules such as power management.

The hardware stack 1012 (also referred to as available computing resources and indicated as module F in FIG. 10) includes hardware platforms, hardware monitoring modules, resource management modules, and other hardware management modules. The hardware stack 1012 further includes platform and system knobs (or settings) that are exposed to the software stack (e.g., to the resource management software component 1010) (also indicated as module C in FIG. 10) and platform and system knobs that are hidden (e.g., to a user of the computing node with the resource configuration architecture 1000) but may be configured/tuned by a service provider via the tuning portal 1014 (also indicated as module D in FIG. 10). The hardware stack 1012 further includes artificial intelligence (AI) accelerators (and/or non-AI accelerators) which may be used in connection with the RCF (e.g., to accelerate the generation of resource mappings during the parameters sweep).

In some aspects, the resource configuration architecture 1000 is configured with RCF for monitoring the hardware and software platforms and processing the telemetry streams that arise. The RCF may be used for configuration fine-tuning, including adjusting various behaviors in the computational devices through "knobs" (or settings) so that the KPIs of services and deployments (scale, density) are maximized. For example, the RCF can be configured for hardware fine-tuning of Resource Director Technology (RDT) knobs and Application Device Queues (ADQ) knobs (and other knobs), which can be applied by circuitry implementing the RCF (e.g., the resource configuration component of FIG. 12). Some settings (e.g., factory settings) are determined through post-production and pre-deployment testing and are generally treated as hidden knobs after those steps. However, both the hidden knobs (e.g., provided in module C in FIG. 10) and the exposed knobs (provided module D in FIG. 10) enable resource optimization once the hardware (e.g., a computing node) enters the field and actual stresses on the available computing resources are established.

Selective and incremental changes to many of these very sensitive knobs can be impactful on diverse usages of a MEC network under multi-tenant stresses. While hardware manufacturers and software designers provide monitoring capabilities, given the possibilities for misuse (e.g., snooping, side-channels, reverse engineering) that are possible from such monitoring, privilege escalation and domain knowledge are often required for gather telemetry information for purposes of resource configuration and optimization. Finally, even if a network administrator has the access privileges and expertise to undertake recalibration of these knobs in the field, such recalibration may be a difficult undertaking as software pressures change, hardware additions and upgrades happen, and environmental conditions like power availability and thermal envelopes change. For example, an addition of a new hardware accelerator can upend calibrated knobs on a CPU or a network device, and upgrading to a new OS can alter the management of many resources in software and therefore render previously optimal BIOS or firmware settings now suboptimal. The disclosed techniques associated with RCF provide functionalities for exploring the optimization space in an automated manner as infrastructure changes take place, or in response to evidence of suboptimal network/device behaviors, without giving rise to stability and safety concerns and without deactivating the network assemblies for a tuning and resource reconfiguration overhaul.

Figure 11:
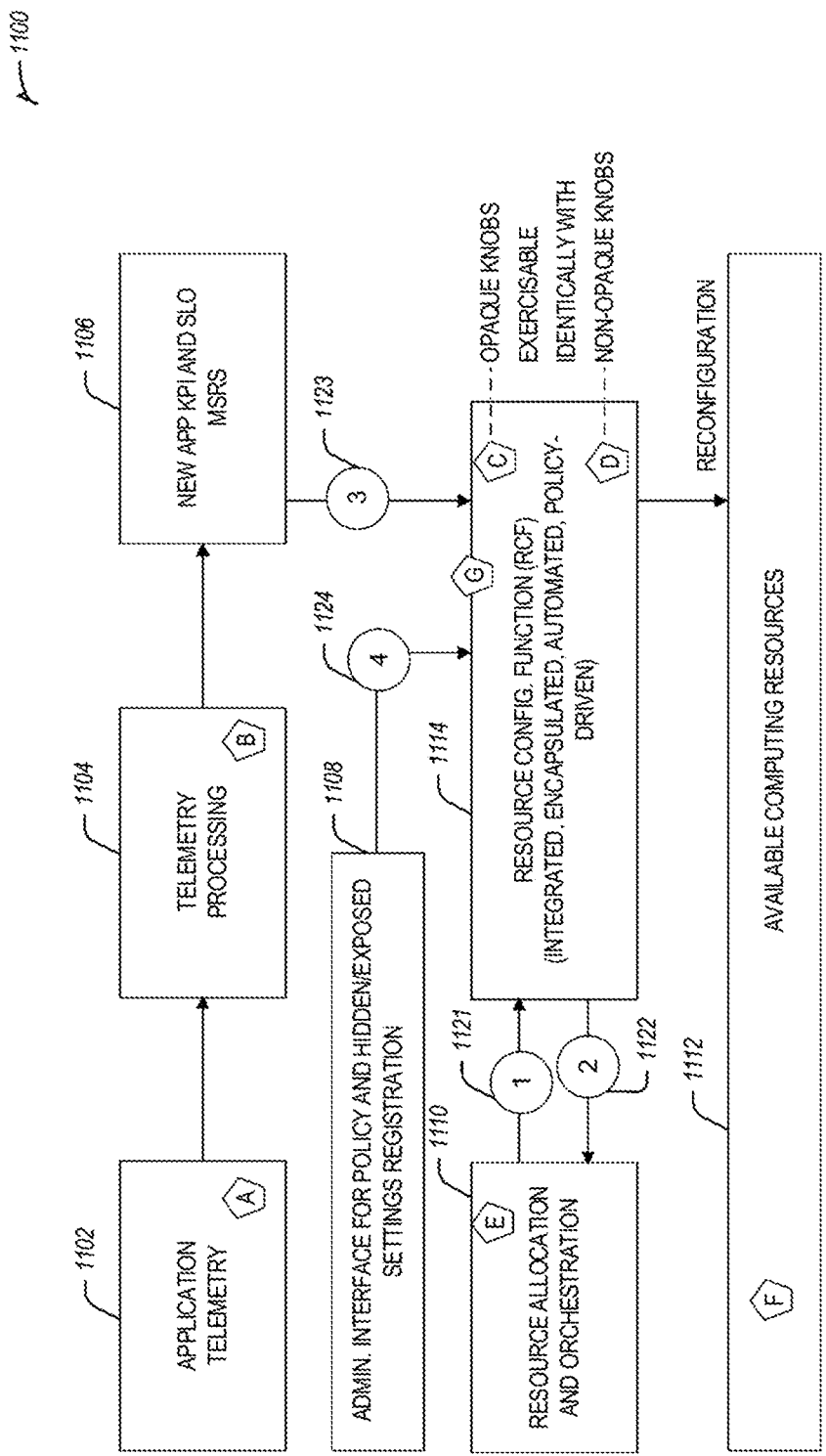
FIG. 11 illustrates example interfaces used by an RCF, according to some embodiments.

FIG. 11 illustrates a diagram 1100 of example interfaces 1121-1124 used by an RCF 1114 (which can be implemented as a resource configuration component indicated as module G in FIG. 11), according to some embodiments. With the resource configuration architecture 1000 in FIG. 10 as the baseline architecture, a summary of the disclosed RCF 1114 (which can be the same as RCF 111) and the interfaces with other modules are illustrated in FIG. 11. Referring to FIG. 11, application telemetry 1102 (e.g., from module A in FIG. 10) is provided to telemetry processing module 1104 (or module B). The processed telemetry information from the telemetry processing module 1104 is used for configuring application KPIs and SLOs as optimization objectives 1106 (stored in machine status registers or MSRs) that can be targeted by performing reconfiguration of available computing resources 1112 using the RCF 1114.

Figure 12:
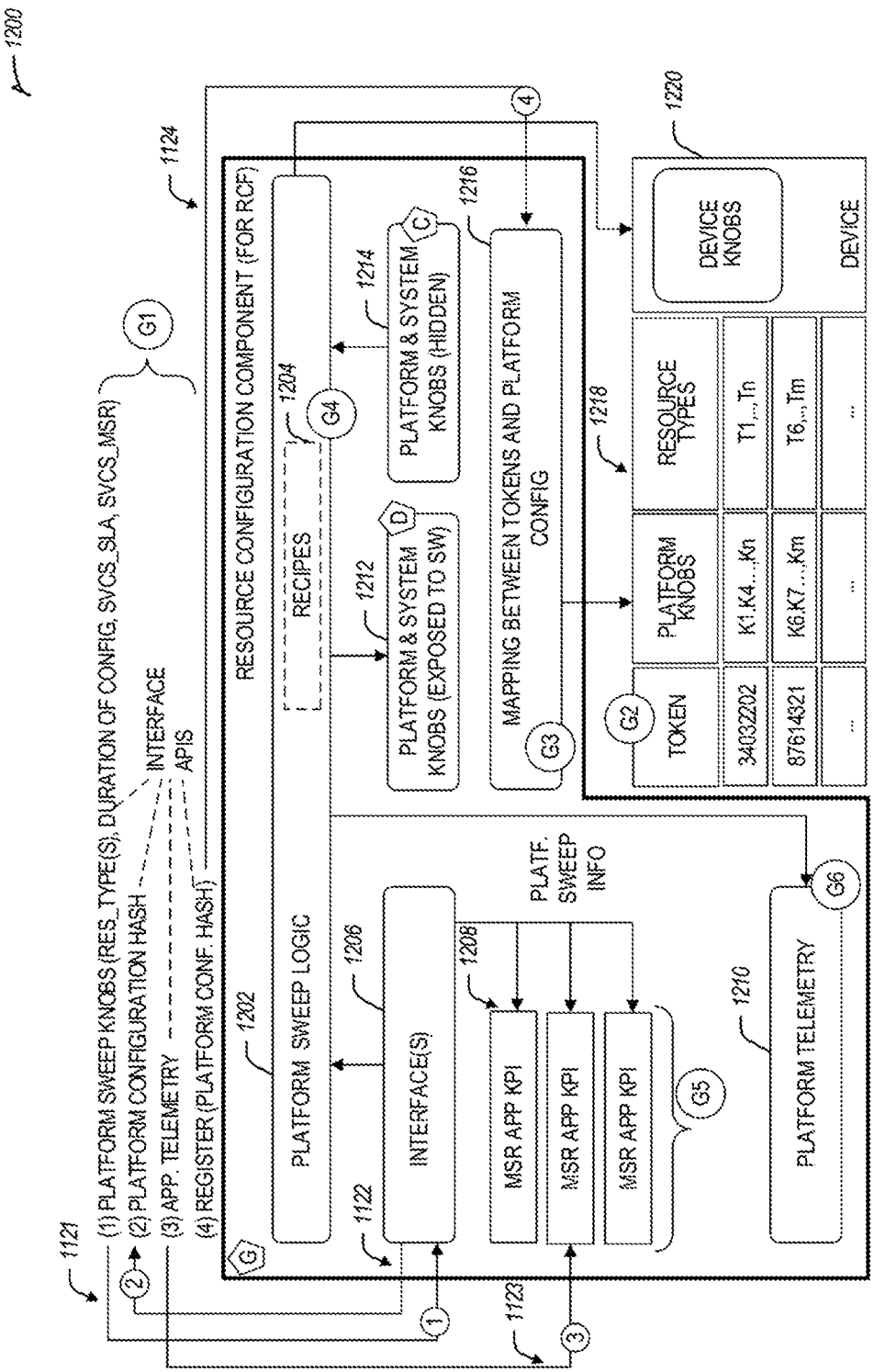
FIG. 12 illustrates a resource configuration component configured to perform RCF for automated node configuration tuning, according to some embodiments.

In some embodiments, RCF 1114 is implemented using a resource configuration component (module G), illustrated in greater detail in FIG. 12. The resource configuration component using RCF 1114 implements a means of selecting a number of parameters and applying them over the various infrastructure elements (e.g., available computing resources 1112 or module F in FIG. 11) without using software to apply these parameters. The parameters (also referred to as knobs, knob settings, or "tunables") determine the various options over behaviors of platforms and devices, and may either be known (exposed) to software (e.g., module D from FIG. 10) or be hidden (e.g., module C from FIG. 10). The parameters, whether hidden or exposed, can be registered with the RCF 1114 through a cryptographically-protected administrative interface 1108 that permits either a local or a remote console to establish a password/certificate protected channel to register the parameters and the values (ranges of values) that the parameters can take via interface 1124. In some embodiments, the administrative interface 1108 is used to configure multiple resource mappings during a parameters sweep where each resource mapping indicates at least one computing resource and a corresponding setting for the at least one computing resource (e.g., as stored in data structure 1218 and FIG. 12).

Whereas in FIG. 10 the tuning portal 1014 may be used for design exploration over actual specified values or ranges of values for the specified parameters, in FIG. 11 such exploration is performed by the RCF 1114 of module G (or resource configuration component 1200) without having to expose the software to the various hidden parameters, and without requiring a software agent with privileges or knowledge for performing the selection and application of parameters. RCF 1114 also implements an option to pick candidate parameter values from specified prior distributions to drive the discovery of optimal parameter settings for various objectives through preconfigured selection functions such as evolutionary algorithms, Bayesian functions, simulated annealing functions, dynamic programming, model-guided, etc. Within such stochastic explorations, parameter values may be limited to various subsets (or sub-ranges) by policy filtering so that various SLO objectives are not put in jeopardy or explorations do not fall into oscillations.

In some embodiments, such exploration may be specified at a coarse granularity from software, through interface 1121 and delegated to the RCF 1114, which implements the automata for carrying out the parameter sweeps. The interface between the resource configuration component using RCF 1114 and its driver (e.g., resource allocation and orchestration module 1110, or module E) also includes an interface 1122 by which module E can retrieve an optimal current configuration (e.g., a top resource mapping entry in data structure 1218 of resource mappings) expressed as an opaque token. In some aspects, the opaque token may be mapped internally within the resource configuration component 1200, and opaque to software, to the collection of parameter settings that maximizes a target optimization objective. In some embodiments, the optimization objectives to be targeted are specified through interface 1123. To preserve previously registered policies and parameters, and to retain a correspondence between parameters and their tokenization reported as "optimal configurations" (from module G to module E, for example), the RCF 1114 of the module G includes mechanisms for persistence such as nonvolatile memory (NVM) or other durable media.

In some embodiments, the RCF 1114 of the module G implements means for automating the adaptation of a machine or any device within it, in the field, by an API and policy-driven optimization process for performing a reconfiguration of available computing resources based on resource mapping. In some aspects, in the application of this optimization process, the resource configuration component 1200 intermediates between a resource orchestration subsystem (such as module E) with obscuration of hidden knobs and with autonomous ability to select and apply various canonical optimization methods (e.g., stochastic selection, interaction models, best-fit, hill-climbing, etc.). The RCF 1114 may use the disclosed interfaces including interface 1121 (for driving exploration), interface 1122 (for retrieving results without un-obscuring hidden knobs), interface 1123 (for specifying SLOs and application telemetry), and interface 1124 (for cryptographically protected registration of knobs and knob control policies which can be used in connection with resource mappings). In some embodiments, additional interfaces (not illustrated in FIG. 11) may be used in connection with collecting and scoring platform telemetry against various parameter sweeps, SLO objectives, etc.

In some embodiments, the automation and how module G offloads the selection of best knobs to a platform component enables a data center or an appliance owner to use periods of low demand or surplus power. For instance, such selection may assist a scenario such as when a solar-powered base appliance can either use or lose a time of peak irradiation energy when its batteries are full, to collaborate with the platform to try to find out better internal configuration for specific workload or workloads.

FIG. 12 illustrates a resource configuration component 1200 configured to perform RCF for automated node configuration tuning, according to some embodiments. Referring to FIG. 12, the resource configuration component 1200 uses interfaces 1121-1124 of FIG. 11 (also referenced as interfaces 1, 2, 3, and 4, respectively, in FIG. 12; and referred collectively as module G1). The resource configuration component 1200 (also referred to as module G) includes a platform sweep logic 1202 (also referred to as module G4) configured to perform platform sweeps using one or more recipes 1204 as discussed herein. The resource configuration component 1200 further includes interface module 1206, MSRs 1208 (also referred to as module G5), a platform telemetry module 1210 (also referred to as module G6), exposed platform and system knobs 1212 (or module D), hidden platform and system knobs 1214 (or module C), the mapping module 1216 (also referred to as module G3) for mapping between tokens and platform configurations within the data structure 1218 (which is also referred to as module G2). Even though the data structure 1218 of resource mappings is illustrated separate from the resource configuration component 1200, the disclosure is not limited in this regard and the data structure 1218 may be part of the resource configuration component 1200 in different aspects.

Module G1 (Interfaces 1121-1124)

Interfaces 1121-1124 are used for communication between components of the resource configuration component 1200 (mainly application SLO management and resource orchestration layers).

In some embodiments, interface 1121 is used for performing a design exploration sweep. Operands for this interface may include resource types, the duration for which the parameter sweep should run, SLA objectives to achieve or to optimize for, and MSRs specifying service telemetry, optimization search parameters, and other qualifications for how the exploration should proceed. One of the MSRs specified may optionally contain a token (which is an opaque hash) or tokens that are the best known previous knob settings (tokenized) from prior iterations (e.g., as stored in data structure 1218 or module G2).

As used herein, the term "parameter sweep" refers to a sequence of functions initiated in response to a parameter sweep request and including selecting computing resources from a set of available computing resources of a computing node, applying the subset to generate a plurality of resource mappings (where each resource mapping indicates the computing resource and a corresponding setting of the plurality of settings). Each of the resource mappings (e.g., as stored in data structure 1218) can be tokenized for easy access and configuration. In this regard, a row in data structure 1218 can include a token in corresponding platform knobs or settings, identification of the computing resource such as resource type (or types multiple resources are included for the corresponding settings), and other information such as a node identifier of the node associated with the computing resource, a node software stack ID, etc.

In some embodiments, interface 1122 is used for retrieving an optimal configuration token (e.g., a hash) in response to a request for reconfiguration of available computing resources. For example, a management module or resource orchestration and provisioning layer of an orchestration management entity may use interface 1122 to obtain from the resource configuration component 1200 the result of one or more prior parameter sweeps with the results stored in data structure 1218 (e.g., in the form of one or more tokens, each token opaquely mapped to a set of parameter results that produced an optimal resource reconfiguration and application performance, or that produced a resource reconfiguration resulting in an application performance that was in a top tier of the parameter sweep results).

In some embodiments, interface 1123 is used for a streaming API, to communicate telemetry information to the resource configuration component 1200. For example, using interface 1123, the resource configuration component 1200 obtains monitoring data from the application (or a suitable proxy), in real-time or in close to real-time. This enables the resource configuration component 1200 to determine that a particular exploration step associated with a parameter sweep is achieving a higher or lower result, and thus determine what its next iteration over the exploration space needs to be.

In some embodiments, interface 1124 is used for registering a system parameter or a knob with the resource configuration component 1200 (e.g., store preconfigured platform knobs/settings and corresponding resource types as entries in the data structure 1218 for subsequent use during reconfiguration of available computing resources). Interface 1124 may be password/certificate protected, allowing for encrypted interaction capability for registering knobs and for creating policy settings for the operation of the resource configuration component 1200. The registered knobs and parameterized policy settings may be stored in data structure 1218 as discussed herein.

Module G2—Data Structure with Hidden and Exposed Knobs

In some embodiments, data structure 1218 includes multiple resource mappings (or resource mapping entries) where the entries map various tokens to collections of parameter settings (e.g., platform knobs) and computing resources (e.g., resource types) as illustrated in FIG. 12. In some aspects, data structure 1218 may be a table, a hash, a key-value store, a multi-level index, etc. Each row in the data structure 1218 maps a token to different data including (a) a set of resource types or knob identifiers (third column), which identifies the computing resource (or resources); and (b) the settings for knobs for those resources (second column). These settings are for both hidden and exposed knobs. There may be additional columns capturing application and platform telemetry in this data structure or there may be other mappings from these settings to the performance and power telemetry. In some embodiments, the tokens in the first column of the data structure 1218 are opaque values that an application can retrieve so that the application or an orchestration layer can refer back to the knob settings to apply or to begin exploring by passing back the tokens through interface 1121 in module G1. In some embodiments, module G2 itself (e.g., data structure 1218) is not exposed to applications (except to management consoles which may access the data structure via, e.g., interface 1124). Data structure 1218 may be implemented on durable storage such as persistent memory (on-chip or off-chip in relation to the resource configuration component 1200.

Module G3—Opaque Mapping Between Tokens and Platform Configurations

Module G2 is a passive data structure (a hash, an index, etc.) that is not accessible outside the resource configuration component 1200. Module G3 (or mapping module 1216) implements the logic for performing the mappings between tokens and parameter sets (e.g., the set including the platform knobs or setting, the resource types identifying the computing resources, and/or other data from the data structure 1218). Module G3 also supports interface 1124 by which policies and knobs can be registered through a secure mechanism as described earlier.

Module G4—Platform Sweep Logic

The platform sweep logic 1202 implements mechanisms, driven by various recipes 1204, for performing the exploration (or parameter sweep) requested through interface 1121 by a module such as module E in FIG. 11. Recipes 1204 in module G4 identify the sequences of knob settings for both sets C and D (respectively, hidden and exposed knobs) for the design space exploration. The recipes may be based on a pre-configured selection function for selecting settings and computing resources to generate the parameter mappings. The pre-configured selection function may include a simulated annealing function, random forest algorithms, a Bayesian function, etc., which functions may be either pre-implemented static functions or may be realized in the field, through microcoding or other embedded coding approaches. In alternative embodiments, the platform sweep logic 1202 may implement a secure channel mechanism so that the sequences may be generated externally by software, local or remote on a given node. In this way, the batch sweep exploration may be conducted at the multi-node granularity and may be supported on a node that is inexpensive and modest in its complexity, by design. In some aspects, module G4 applies the selected knobs on a computing node such as device 1220, which may have one or more of its knobs set by module G4 in the course of a sweep in which the selection of the one or more knobs is part of a sequence produced by the recipe.

Once the platform sweep logic 1202 selects a recipe from the recipes 1204, it also monitors the application performance telemetry that is made visible to it through module G5 described below. The platform sweep logic 1202 also has its various operational controls such as duration of exploration, starting or stopping conditions for the exploration, encoded in those MSRs as a result of the interface request or platform sweep request received via interface 1121. During its exploration, module G4 also tracks platform telemetry available to it through the platform telemetry module 1210. As it performs the evaluation, the platform sweep logic 1202 checks whether application performance is meeting or exceeding the desired SLOs by monitoring the application and platform telemetry. For each sample that it explores, it records the figures of merit (such as performance, power-efficiency, resource oversubscription, etc.) so that it can identify and persist the most optimal or the top K candidates and their scores on those KPIs into the data structure 1218 as individual resource mappings. For each resource mapping that the platform sweep logic 1202 adds to data structure 1218, it also generates a token, and it returns these tokens and their corresponding resource mappings and performance scores (e.g., application telemetry information associated with the resource mapping and received via the MSRs 1208 and interface 1123) through interface 1122 or makes these tokens and their corresponding resource mapping and performance scores available for retrieval through interface 1122. The platform sweep logic 1202 may discard those evaluations and resource mappings that fail the minimum targets (e.g., associated with one or more SLOs) specified to it through MSRs 1208 and interface 1123.

Module G5—Registers for Scoring and Controlling Operations

While the platform sweep logic 1202 applies various knobs on the hardware stack 1012 (or module F) under exploration, it obtains the response to its application of those knobs through the performance telemetry that streams into module G5 through various registers such as MSRs (and platform telemetry that streams in through module G6). Other registers in module G5 may include control variables that determine the maximum duration of the sweep, which prior parameter settings (encoded by tokens from module G2) the sweep should begin at, etc. Module G5 may also provide either static or dynamic conditions under which module G4 should terminate the exploration, even if less time has gone by in the exploration than the max duration.

Module G6—Platform Telemetry

The optimization objectives may include platform resource consumption, efficiency, and power. Additionally, the knob sweeps which are performed by module G4 may be guard-railed by various resource saturations. For example, in a given situation S1, suppose an application is exceeding its minimum target SLO for response time but is delivering less throughput than an earlier trial knob setting S2 in which it was also meeting its response time SLO but was delivering higher throughput. If the platform telemetry were to indicate that under S1, the power consumption was near saturation but processors were idling while under S2, the processors were saturated but power consumption was not saturated. Additional processing may include pruning the exploration sweep for S1 but continuing the sweep in the neighborhood of S2 as more power has the potential to be translated into higher frequency (even at CPUs being fully utilized), and alternative, a lesser amount of power may still yield similar throughput if the workload were not highly sensitive to processor frequency, and thus help drive a better efficiency result. To ensure that all inputs are available to the recipe generation in module G4, module G4 also obtains platform telemetry readings from module G6. An example operation sequence of the resource configuration component 1200 is discussed in connection with FIG. 14.

FIG. 13 illustrates a diagram 1300 of the resource configuration architecture of FIG. 10 configured with the resource configuration component 1200 performing RCFs, according to some embodiments. FIG. 13 places the resource configuration component 1200 (or module G) in the context of the baseline resource configuration architecture 1000 of FIG. 10. Diagram 1300 illustrates an example outline of a system-level operation flow, showing how the resource management software component 1010 invokes the capabilities of module G to perform parameter sweeps. Such parameter sweeps can be performed at any time, but ideally, they may be initiated by a parameter sweep request based on resource optimization need and opportunity. In some aspects, optimization needs may arise when there is a significant change (e.g., above a threshold level) in platform hardware infrastructure, or when there is a significant upgrade in system or application software. Such factors may be determined not arbitrarily in low-level logic but based on operator knowledge, and based on the solution requirements expressed by developers and solution deployers in other layers (including module A, the app life-cycle management layer in module B, and module E in FIG. 10). Opportunities for resource optimization and initiating a parameter sweep arises when there are surplus energy and computational resources, or slack in request arrival rates to perform the knob-recalibration experiments. Need or opportunity may also arise when long-term studies of application and platform telemetry identify stranding of computational capacity. In this regard, the parameter sweep request may be generated by an orchestration management entity in connection with optimizing a node that the management entity detects may benefit from resource optimization. In other aspects, a node's board management controller (implementing the resource configuration component, initiates the parameter sweep to improve its resource optimization.

An example of a system-level operation flow using the disclosed resource configuration component is as follows. Using a new platform interface, the system software stack asks the platform to change some of the internal configuration knobs using, for instance, an ensemble learning method. The knobs to be varied may, in general, be limited to only a certain type of resources. The software stack specifies module G (through various MSRs) where it will populate and update service KPIs, SLOs, etc. For example, for a video analytics service, the KPI may be expressed as several frames processed per second, and the SLO may indicate that the desired target is to meet or exceed 60 frames per second. The software stack may also specify how long the exploration should last before returning the best candidate, or top K best candidate configurations as resource mappings. It may also specify other criteria for stopping the exploration, such as, for example, "no change in recommendation in last K iterations of exploration".

The exploration component of module G, and in particular module G4, begins generating a sequence of knob setting experiments (e.g., resource mappings), drawing values for various knobs from a set of pre-configured probability distribution functions (PDFs), with the PDF parameters dialed in based on the exploration algorithm. These variations can include visible and hidden knobs. As it applies generated knob settings, module G monitors the KPIs that are being achieved (e.g., through app telemetry streaming in via interface 1123) and scores these against SLO KPI targets, and discards settings (or resource mappings) that fail to survive this preliminary filtering. The resource configuration component 1200 retains the most optimal K of the knob settings (or the best K of the priors in the case that the recipe is a probabilistic algorithm) as top K row entries in data structure 1218. At any time, the software stack can retrieve the optimal K row entries, and at any time the software stack can request module G to discontinue or to suspend the parameter sweep. The software stack retrieves the optimal settings not as parameter values themselves, but as tokens that translate to corresponding resource mappings the parameter values (through modules G2 and G3) as described earlier.

Over time, the software stack can use the different discovered configurations to improve them (using the tokens from the data structure 1218 as reference) and exploring other platform resources associated with other resource mappings to optimize the available computing resources. The optimal configurations are then applied for resource optimization, depending on which service is being executed. While the above example flow is described by referring to the KPIs for a single service execution, the disclosure is not limited in this regard and the disclosed RCF may apply to multi-service executions as well.

In some embodiments, the resource management software component 1010 includes a service application 1302. The service application 1302 (e.g., an edge management application or another type of management application) may be used to manage and control computing nodes over a communication medium (e.g., the Internet, a Cloud network, Bluetooth, etc.) in connection with the disclosed functions. In this regard, the service application 1302 may be executed by a network management node, such as a network orchestrator.

The service application 1302 may also be used for configuring and managing settings associated with the disclosed functions. In this regard, the service application 1302 may include a user interface 1304 providing access to various functionalities of the resource configuration component 1200. In one embodiment, a user (e.g., a network administrator) having access to the service application 1302 may use the user interface 1304 to configure the hidden platform and system knobs 1214.

In another embodiment, the user interface 1304 may be used (e.g., by a network administrator) to configure the recipes 1204 for performing the exploration (or parameter sweep) requested through interface 1121 in FIG. 11. More specifically, user interface 1304 may be used to identify sequences of knob settings for both sets C and D (respectively, hidden and exposed knobs in FIG. 11 and FIG. 12) for the design space exploration. Additionally, the user interface 1304 may be used to identify not only the sequences of knob settings but also the computing resources that the settings should be applied to during the parameter sweeps. In some aspects, the user interface 1304 may be used to configure a selection function for selecting the settings and the computing resources for generating the parameter mappings during the parameter sweeps.

In yet another embodiment, the user interface 1304 may be used as the cryptographically-protected administrative interface 1108 that permits either a local or a remote console executing the service application 1302 to establish a password/certificate protected channel to register the parameters and the values (ranges of values) that the parameters can take via interface 1124. In this regard, the user interface 1108 may be used to configure multiple resource mappings (e.g., as stored in data structure 1218 and FIG. 12), with each resource mapping indicating at least one computing resource and a corresponding setting for the at least one computing resource.

FIG. 14 illustrates a flowchart of a method 1400 for resource configuration in an edge system, according to an example embodiment. Method 1400 may be performed by a computing node (e.g., node 800 or node 850) implementing a resource configuration component (e.g., resource configuration component 1200) performing the disclosed resource configuration functions (e.g., RCF 111 or RCF 1114). In some embodiments, method 1400 may be performed by a board management controller (BMC) of a computing node (node 800 or node 850).

At operation 1402, a subset of computing resources is selected from a set of available computing resources of the node to initiate a parameter sweep. For example, the resource configuration component 1200 may receive a parameter sweep request (e.g., via a network interface card or NIC) and may select the subset based on one of the recipes 1204. In the alternative, the parameter sweep request is generated by a board management controller of the node, which implements the disclosed resource configuration component.

At operation 1404, a plurality of settings is applied to each computing resource of the subset to generate a plurality of resource mappings during the parameter sweep. For example, the resource configuration component 1200 applies one or more of the settings to a corresponding computing resource to generate a corresponding resource mapping. In this regard, each resource mapping of the plurality of resource mappings indicates at least one computing resource of the subset and a corresponding at least one setting of the plurality of settings.

At operation 1406, telemetry information for the subset of computing resources is retrieved, where the telemetry information is generated during the parameter sweep. For example, telemetry information is generated after applying the one or more of the settings to a corresponding computing resource to generate the corresponding resource mapping. Put another way, telemetry associated with each resource mapping is read (e.g., after the settings are applied to the resource) and persisted (e.g., in MSRs 1208).

At operation 1408, a resource mapping of the plurality of resource mappings is selected based on a comparison of the telemetry information with a service level objective (SLO) associated with the request. For example, the resource configuration component 1200 detects an SLO (e.g., stored in MSRs 1208) and determines a resource mapping with corresponding telemetry information that most optimally/close matches the detected SLOs. At operation 1410, a reconfiguration of the available computing resources is performed based on the selected resource mapping.

In some embodiments, the parameter sweep request includes the SLO, the duration of the parameter sweep, and identification information of a machine state register (MSR) of a memory of the node. In some embodiments, the MSR stores a token. The token indicates at least one prior resource mapping generated during a prior parameter sweep of the set of available resources, the at least one prior resource mapping indicating prior settings, and a prior subset of the available computing resources.

In some embodiments, the resource configuration component 1200 is further configured to apply the prior settings to the prior subset of the available computing resources as an initial configuration of the node associated with the parameter sweep.

In some embodiments, the resource configuration component 1200 is further configured to select a subset of resource mappings from the plurality of resource mappings based on the comparison of the telemetry information with the SLO associated with the request. The resource configuration component 1200 is further configured to apply a hash function to each resource mapping in the subset of resource mappings to generate a subset of tokens, and store each token of the subset of tokens and a corresponding resource mapping of the subset of resource mappings in a data structure (e.g., data structure 1218) in a storage device of the node according to a storing order. The storing order is based on a degree of matching the telemetry information with the SLO (e.g., the most optimal or best matching is stored as a top row in the data structure 1218, etc.).

In some embodiments, the resource configuration component 1200 is further configured to decode a reconfiguration request received via the NIC. The resource configuration component 1200 is further configured to retrieve a second resource mapping from the data structure, the second resource mapping associated with the highest degree of matching the telemetry information with the SLO. The resource configuration component 1200 is further configured to perform a subsequent reconfiguration of the available computing resources in response to the reconfiguration request, the subsequent reconfiguration based on the second resource mapping.

In some embodiments, the resource configuration component 1200 is further configured to establish a secure communication path to at least a second computing node in the MEC network, and decode a registration request for additional resource mappings, the registration request received via the NIC.

The registration request includes the additional resource mappings, and the resource configuration component 1200 is further configured to update the data structure with the additional resource mappings.

In some embodiments, the resource configuration component 1200 is further configured to select the plurality of settings and the subset of computing resources from the set of available computing resources according to a pre-configured selection function. The pre-configured selection function is at least one of a simulated annealing function, a random forest selection function, and a Bayesian function.

In some embodiments, the resource configuration component 1200 is further configured to decode a configuration message from a second computing node in the MEC network, the configuration message indicating the plurality of settings and the subset of computing resources.

In some embodiments, the resource configuration component 1200 is further configured to decode a configuration message from a second computing node in the MEC network, the configuration message indicating a pre-configured selection function, and select the plurality of settings and the subset of computing resources from the set of available computing resources according to the pre-configured selection function.

In some embodiments, the available computing resources include one or more central processing unit (CPU) resources (the CPU resources including several CPU cores configured to operate at a corresponding frequency setting), power resources, storage resources, and communication resources (e.g., communication modem resources).

It should be understood that the functional units or capabilities described in this specification may have been referred to or labeled as components, circuits, or modules, to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Additional Examples and Aspects

Example 1 is a computing node to implement an orchestration management entity in a Multi-Access Edge Computing (MEC) network, the node including a network interface card (NIC) and processing circuitry coupled to the NIC. The processing circuitry is configured to select a subset of computing resources from a set of available computing resources of the node to initiate a parameter sweep, the parameter sweep associated with a parameter sweep request received via the NIC; apply a plurality of settings to each computing resource of the subset to generate a plurality of resource mappings during the parameter sweep, each resource mapping of the plurality of resource mappings indicating at least one computing resource of the subset and a corresponding at least one setting of the plurality of settings; retrieve telemetry information for the subset of computing resources, the telemetry information generated during the parameter sweep; select a resource mapping of the plurality of resource mappings based on a comparison of the telemetry information with a service level objective (SLO) associated with the request; and perform a reconfiguration of the available computing resources based on the selected resource mapping.

In Example 2, the subject matter of Example 1 includes subject matter where the request includes the SLO, the duration of the parameter sweep, and identification information of a machine state register (MSR) of a memory of the node.

In Example 3, the subject matter of Example 2 includes subject matter where the MSR stores a token, and wherein the token indicates at least one prior resource mapping generated during a prior parameter sweep of the set of available resources, the at least one prior resource mapping indicating prior settings and a prior subset of the available computing resources.

In Example 4, the subject matter of Example 3 includes subject matter where the processing circuitry is configured to: apply the prior settings to the prior subset of the available computing resources as an initial configuration of the node associated with the parameter sweep.

In Example 5, the subject matter of Examples 1-4 includes subject matter where the processing circuitry is configured to: select a subset of resource mappings from the plurality of resource mappings based on the comparison of the telemetry information with the SLO associated with the request.

In Example 6, the subject matter of Example 5 includes subject matter where the processing circuitry is configured to: apply a hash function to each resource mapping in the subset of resource mappings to generate a subset of tokens; and store each token of the subset of tokens and a corresponding resource mapping of the subset of resource mappings in a data structure in a storage device of the node according to a storing order, the storing order based on a degree of matching the telemetry information with the SLO.

In Example 7, the subject matter of Example 6 includes subject matter where the processing circuitry is configured to: decode a reconfiguration request received via the NIC; retrieve a second resource mapping from the data structure, the second resource mapping associated with a highest degree of matching the telemetry information with the SLO; and perform a subsequent reconfiguration of the available computing resources in response to the reconfiguration request, the subsequent reconfiguration based on the second resource mapping.

In Example 8, the subject matter of Examples 6-7 includes subject matter where the processing circuitry is configured to establish a secure communication path to at least a second computing node in the MEC network; and decode a registration request for additional resource mappings, the registration request received via the NIC.

In Example 9, the subject matter of Example 8 includes subject matter where the registration request includes the additional resource mappings, and wherein the processing circuitry is configured to: update the data structure with the additional resource mappings.

In Example 10, the subject matter of Examples 1-9 includes subject matter where the processing circuitry is configured to select the plurality of settings and the subset of computing resources from the set of available computing resources according to a pre-configured selection function.

In Example 11, the subject matter of Example 10 includes subject matter where the pre-configured selection function is at least one of a simulated annealing function; a random forest selection function; a Bayesian function.

In Example 12, the subject matter of Examples 1-11 includes subject matter where the processing circuitry is configured to: decode a configuration message from a second computing node in the MEC network, the configuration message indicating the plurality of settings and the subset of computing resources.

In Example 13, the subject matter of Examples 1-12 includes subject matter where the processing circuitry is configured to decode a configuration message from a second computing node in the MEC network, the configuration message indicating a pre-configured selection function; and select the plurality of settings and the subset of computing resources from the set of available computing resources according to the pre-configured selection function.

In Example 14, the subject matter of Examples 1-13 includes subject matter where the available computing resources include one or more: central processing unit (CPU) resources, the CPU resources comprising a number of CPU cores configured to operate at a corresponding frequency setting; storage resources; power resources; and communication resources, the communication resources comprising communication modem resources.

Example 15 is at least one machine-readable storage medium comprising instructions stored thereupon, which when executed by processing circuitry of a computing node operable to implement an orchestration management entity in a Multi-Access Edge Computing (MEC) network, cause the processing circuitry to perform operations comprising: selecting a subset of computing resources from a set of available computing resources of the node to initiate a parameter sweep, the parameter sweep associated with a parameter sweep request received via a network interface card (NIC); applying a plurality of settings to each computing resource of the subset to generate a plurality of resource mappings during the parameter sweep, each resource mapping of the plurality of resource mappings indicating at least one computing resource of the subset and a corresponding at least one setting of the plurality of settings; retrieving telemetry information for the subset of computing resources, the telemetry information generated during the parameter sweep; selecting a resource mapping of the plurality of resource mappings based on a comparison of the telemetry information with a service level objective (SLO) associated with the request; and performing a reconfiguration of the available computing resources based on the selected resource mapping.

In Example 16, the subject matter of Example 15 includes subject matter where the request includes the SLO, a duration of the parameter sweep, and identification information of a machine state register (MSR) of a memory of the node.

In Example 17, the subject matter of Example 16 includes subject matter where the MSR stores a token, and wherein the token indicates at least one prior resource mapping generated during a prior parameter sweep of the set of available resources, the at least one prior resource mapping indicating prior settings and a prior subset of the available computing resources.

In Example 18, the subject matter of Example 17 includes subject matter where the processing circuitry further performs operations comprising: applying the prior settings to the prior subset of the available computing resources as an initial configuration of the node associated with the parameter sweep.

In Example 19, the subject matter of Examples 15-18 includes subject matter where the processing circuitry further performs operations comprising: selecting a subset of resource mappings from the plurality of resource mappings based on the comparison of the telemetry information with the SLO associated with the request.

In Example 20, the subject matter of Example 19 includes subject matter where the processing circuitry further performs operations comprising: applying a hash function to each resource mapping in the subset of resource mappings to generate a subset of tokens; and storing each token of the subset of tokens and a corresponding resource mapping of the subset of resource mappings in a data structure in a storage device of the node according to a storing order, the storing order based on a degree of matching the telemetry information with the SLO.

In Example 21, the subject matter of Example 20 includes subject matter where the processing circuitry further performs operations comprising: decoding a reconfiguration request received via the NIC; retrieving a second resource mapping from the data structure, the second resource mapping associated with a highest degree of matching the telemetry information with the SLO; and performing a subsequent reconfiguration of the available computing resources in response to the reconfiguration request, the subsequent reconfiguration based on the second resource mapping.

In Example 22, the subject matter of Examples 20-21 includes subject matter where the processing circuitry further performs operations comprising: establishing a secure communication path to at least a second computing node in the MEC network; and decoding a registration request for additional resource mappings, the registration request received via the NIC.

In Example 23, the subject matter of Example 22 includes subject matter where the registration request includes the additional resource mappings, and wherein the processing circuitry further performs operations comprising: updating the data structure with the additional resource mappings.

In Example 24, the subject matter of Examples 15-23 includes subject matter where the processing circuitry further performs operations comprising: selecting the plurality of settings and the subset of computing resources from the set of available computing resources according to a pre-configured selection function.

In Example 25, the subject matter of Example 24 includes subject matter where the pre-configured selection function is at least one of a simulated annealing function; a random forest selection function; and a Bayesian function.

In Example 26, the subject matter of Examples 15-25 includes subject matter where the processing circuitry further performs operations comprising: decoding a configuration message from a second computing node in the MEC network, the configuration message indicating the plurality of settings, and the subset of computing resources.

In Example 27, the subject matter of Examples 15-26 includes subject matter where the processing circuitry further performs operations comprising: decoding a configuration message from a second computing node in the MEC network, the configuration message indicating a pre-configured selection function; and selecting the plurality of settings and the subset of computing resources from the set of available computing resources according to the pre-configured selection function.

In Example 28, the subject matter of Examples 15-27 includes subject matter where the available computing resources include one or more of the following: central processing unit (CPU) resources, the CPU resources comprising a number of CPU cores configured to operate at a corresponding frequency setting; power resources; storage resources; and communication resources, the communication resources comprising communication modem resources.

Example 29 is a computing node to implement an orchestration management entity in a Multi-Access Edge Computing (MEC) network, the node comprising: means for selecting a subset of computing resources from a set of available computing resources of the node to initiate a parameter sweep, the parameter sweep associated with a parameter sweep request received via a network interface card (NIC); means for applying a plurality of settings to each computing resource of the subset to generate a plurality of resource mappings during the parameter sweep, each resource mapping of the plurality of resource mappings indicating at least one computing resource of the subset and a corresponding at least one setting of the plurality of settings; means for retrieving telemetry information for the subset of computing resources, the telemetry information generated during the parameter sweep; means for selecting a resource mapping of the plurality of resource mappings based on a comparison of the telemetry information with a service level objective (SLO) associated with the request; and means for performing a reconfiguration of the available computing resources based on the selected resource mapping.

In Example 30, the subject matter of Example 29 includes subject matter where the request includes the SLO, a duration of the parameter sweep, and identification information of a machine state register (MSR) of a memory of the node.

In Example 31, the subject matter of Example 30 includes subject matter where the MSR stores a token, and wherein the token indicates at least one prior resource mapping generated during a prior parameter sweep of the set of available resources, the at least one prior resource mapping indicating prior settings and a prior subset of the available computing resources.

In Example 32, the subject matter of Example 31 includes, means for applying the prior settings to the prior subset of the available computing resources as an initial configuration of the node associated with the parameter sweep.

In Example 33, the subject matter of Examples 29-32 includes, means for selecting a subset of resource mappings from the plurality of resource mappings based on the comparison of the telemetry information with the SLO associated with the request.

In Example 34, the subject matter of Example 33 includes, means for applying a hash function to each resource mapping in the subset of resource mappings to generate a subset of tokens; and means for storing each token of the subset of tokens and a corresponding resource mapping of the subset of resource mappings in a data structure in a storage device of the node according to a storing order, the storing order based on a degree of matching the telemetry information with the SLO.

In Example 35, the subject matter of Example 34 includes, means for decoding a reconfiguration request received via the NIC; means for retrieving a second resource mapping from the data structure, the second resource mapping associated with a highest degree of matching the telemetry information with the SLO; and means for performing a subsequent reconfiguration of the available computing resources in response to the reconfiguration request, the subsequent reconfiguration based on the second resource mapping.

In Example 36, the subject matter of Examples 34-35 includes, means for establishing a secure communication path to at least a second computing node in the MEC network; and means for decoding a registration request for additional resource mappings, the registration request received via the NIC.

In Example 37, the subject matter of Example 36 includes subject matter where the registration request includes the additional resource mappings, and the node further includes means for updating the data structure with the additional resource mappings.

In Example 38, the subject matter of Examples 29-37 includes, means for selecting the plurality of settings and the subset of computing resources from the set of available computing resources according to a pre-configured selection function.

In Example 39, the subject matter of Example 38 includes subject matter where the pre-configured selection function is at least one of a simulated annealing function; a random forest selection function; a Bayesian function.

In Example 40, the subject matter of Examples 29-39 includes, means for decoding a configuration message from a second computing node in the MEC network, the configuration message indicating the plurality of settings and the subset of computing resources.

In Example 41, the subject matter of Examples 29-40 includes, means for decoding a configuration message from a second computing node in the MEC network, the configuration message indicating a pre-configured selection function; and means for selecting the plurality of settings and the subset of computing resources from the set of available computing resources according to the pre-configured selection function.

In Example 42, the subject matter of Examples 29-41 includes subject matter where the available computing resources include one or more: central processing unit (CPU) resources, the CPU resources comprising a number of CPU cores configured to operate at a corresponding frequency setting; power resources; storage resources; and communication resources, the communication resources comprising communication modem resources.

Example 43 is at least one machine-readable medium including instructions that, when executed by processing circuitry, cause the processing circuitry to perform operations to implement any of Examples 1-42.

Example 44 is an apparatus comprising means to implement any of Examples 1-42.

Example 45 is a system to implement any of Examples 1-42.

Example 46 is a method to implement any of Examples 1-42.

Example 47 is a multi-tier edge computing system, comprising a plurality of edge computing nodes provided among on-premise edge, network access edge, or near edge computing settings, the plurality of edge computing nodes configured to perform any of the methods of Examples 1-42.

Example 48 is an edge computing system, comprising a plurality of edge computing nodes, each of the plurality of edge computing nodes configured to perform any of the methods of Examples 1-42.

Example 49 is an edge computing node, operable as a server hosting the service and a plurality of additional services in an edge computing system, configured to perform any of the methods of Examples 1-42.

Example 50 is an edge computing node, operable in a layer of an edge computing network as an aggregation node, network hub node, gateway node, or core data processing node, configured to perform any of the methods of Examples 1-42.

Example 51 is an edge provisioning, orchestration, or management node, operable in an edge computing system, configured to implement any of the methods of Examples 1-42.

Example 52 is an edge computing network, comprising networking and processing components configured to provide or operate a communications network, to enable an edge computing system to implement any of the methods of Examples 1-42.

Example 53 is an access point or a base station, comprising networking and processing components configured to provide or operate a communications network, to enable an edge computing system to implement any of the methods of Examples 1-42.

Example 54 is a road-side unit, comprising networking components configured to provide or operate a communications network, configured as an edge computing system to implement any of the methods of Examples 1-42.

Example 55 is an on-premise server, operable in a private communications network distinct from a public edge computing network, configured as an edge computing system to implement any of the methods of Examples 1-42.

Example 56 is a 3GPP 4G/LTE mobile wireless communications system, comprising networking and processing components configured as an edge computing system to implement any of the methods of Examples 1-42.

Example 57 is a 5G network mobile wireless communications system, comprising networking and processing components configured as an edge computing system to implement any of the methods of Examples 1-42.

Example 58 is an edge computing system configured as an edge mesh, provided with a microservice cluster, a microservice cluster with sidecars, or linked microservice clusters with sidecars, configured to implement any of the methods of Examples 1-42.

Example 59 is an edge computing system, comprising circuitry configured to implement services with one or more isolation environments provided among dedicated hardware, virtual machines, containers, or virtual machines on containers, the edge computing system configured to implement any of the methods of Examples 1-42.

Example 60 is an edge computing system, comprising networking and processing components to communicate with a user equipment device, client computing device, provisioning device, or management device to implement any of the methods of Examples 1-42.

Example 61 is networking hardware with network functions implemented thereupon, operable within an edge computing system, the network functions configured to implement any of the methods of Examples 1-42.

Example 62 is acceleration hardware with acceleration functions implemented thereupon, operable in an edge computing system, the acceleration functions configured to implement any of the methods of Examples 1-42.

Example 63 is storage hardware with storage capabilities implemented thereupon, operable in an edge computing system, the storage hardware configured to implement any of the methods of Examples 1-42.

Example 64 is computation hardware with compute capabilities implemented thereupon, operable in an edge computing system, the computation hardware configured to implement any of the methods of Examples 1-42.

Example 65 is an edge computing system configured to implement services with any of the methods of Examples 1-42, with the services relating to one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 66 is an apparatus of an edge computing system comprising: one or more processors and one or more computer-readable media comprising instructions that, when executed by the one or more processors, cause the one or more processors to perform any of the methods of Examples 1-42.

Example 67 is one or more computer-readable storage media comprising instructions to cause an electronic device of an edge computing system, upon execution of the instructions by one or more processors of the electronic device, to perform any of the methods of Examples 1-42.

Example 68 is a computer program used in an edge computing system, the computer program comprising instructions, wherein execution of the program by a processing element in the edge computing system is to cause the processing element to perform any of the methods of Examples 1-42.

Example 69 is an edge computing appliance device operating as a self-contained processing system, comprising a housing, case, or shell, network communication circuitry, storage memory circuitry, and processor circuitry adapted to perform any of the methods of Examples 1-42.

Example 70 is an apparatus of an edge computing system comprising means to perform any of the methods of Examples 1-42.

Example 71 is an apparatus of an edge computing system comprising logic, modules, or circuitry to perform any of the methods of Examples 1-42.

Example 72 is an edge computing system, including respective edge processing devices and nodes to invoke or perform any of the operations of Examples 1-42, or other subject matter described herein.

Example 73 is a client endpoint node, operable to invoke or perform the operations of any of Examples 1-42, or other subject matter described herein.

Example 74 is an aggregation node, network hub node, gateway node, or core data processing node, within or coupled to an edge computing system, operable to invoke or perform the operations of any of Examples 1-42, or other subject matter described herein.

Example 75 is an access point, base station, road-side unit, street-side unit, or on-premise unit, within or coupled to an edge computing system, operable to invoke or perform the operations of any of Examples 1-42, or other subject matter described herein.

Example 76 is an edge provisioning node, service orchestration node, application orchestration node, or multi-tenant management node, within or coupled to an edge computing system, operable to invoke or perform the operations of any of Examples 1-42, or other subject matter described herein.

Example 77 is an edge node operating an edge provisioning service, application or service orchestration service, virtual machine deployment, container deployment, function deployment, and compute management, within or coupled to an edge computing system, operable to invoke or perform the operations of any of Examples 1-42, or other subject matter described herein.

Example 78 is an edge computing system including aspects of network functions, acceleration functions, acceleration hardware, storage hardware, or computation hardware resources, operable to invoke or perform the use cases discussed herein, with use of any Examples 1-42, or other subject matter described herein.

Example 79 is an edge computing system adapted for supporting client mobility, vehicle-to-vehicle (V2V), vehicle-to-everything (V2X), or vehicle-to-infrastructure (V2I) scenarios, and optionally operating according to European Telecommunications Standards Institute (ETSI) Multi-Access Edge Computing (MEC) specifications, operable to invoke or perform the use cases discussed herein, with use of any of Examples 1-42, or other subject matter described herein.

Example 80 is an edge computing system adapted for mobile wireless communications, including configurations according to a 3GPP 4G/LTE or 5G network capabilities, operable to invoke or perform the use cases discussed herein, with use of any of Examples 1-42, or other subject matter described herein.

Example 81 is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of any of Examples 1-42, or other subject matter described herein.

Example 82 is networking hardware, acceleration hardware, storage hardware, or computation hardware, with capabilities implemented thereupon, operable in an edge computing system to invoke or perform the use cases discussed herein, with use of any of Examples 1-42, or other subject matter described herein.

Example 83 is an apparatus of an edge computing system comprising: one or more processors and one or more computer-readable media comprising instructions that, when deployed and executed by the one or more processors, cause the one or more processors to invoke or perform the use cases discussed herein, with use of any of Examples 1-42, or other subject matter described herein.

Example 84 is one or more computer-readable storage media comprising instructions to cause an electronic device of an edge computing system, upon execution of the instructions by one or more processors of the electronic device, to invoke or perform the use cases discussed herein, with the use of any of Examples 1-42, or other subject matter described herein.

Example 85 is an apparatus of an edge computing system comprising means, logic, modules, or circuitry to invoke or perform the use cases discussed herein, with the use of any of Examples 1-42, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

What is claimed is:

1. A computing node to implement an orchestration management entity in a Multi-Access Edge Computing (MEC) network, the node comprising:
   a network interface card (NIC); and
   processing circuitry coupled to the NIC, the processing circuitry configured to:
   select a subset of computing resources from a set of available computing resources of the node to initiate a parameter sweep, the parameter sweep associated with a parameter sweep request received via the NIC;
   apply a plurality of settings to each computing resource of the subset to generate a plurality of resource mappings during the parameter sweep, each resource mapping of the plurality of resource mappings indicating at least one computing resource of the subset and a corresponding at least one setting of the plurality of settings;

retrieve telemetry information for the subset of computing resources, the telemetry information generated during the parameter sweep;

select a resource mapping of the plurality of resource mappings based on a comparison of the telemetry information with a service level objective (SLO) associated with the request; and perform a reconfiguration of the available computing resources based on the selected resource mapping.

2. The node of claim 1, wherein the request includes the SLO, a duration of the parameter sweep, and identification information of a machine state register (MSR) of a memory of the node.

3. The node of claim 2, wherein the MSR stores a token, and wherein the token indicates at least one prior resource mapping generated during a prior parameter sweep of the set of available resources, the at least one prior resource mapping indicating prior settings and a prior subset of the available computing resources.

4. The node of claim 3, wherein the processing circuitry is configured to:

apply the prior settings to the prior subset of the available computing resources as an initial configuration of the node associated with the parameter sweep.

5. The node of claim 1, wherein the processing circuitry is configured to:

select a subset of resource mappings from the plurality of resource mappings based on the comparison of the telemetry information with the SLO associated with the request.

6. The node of claim 5, wherein the processing circuitry is configured to:

apply a hash function to each resource mapping in the subset of resource mappings to generate a subset of tokens; and store each token of the subset of tokens and a corresponding resource mapping of the subset of resource mappings in a data structure in a storage device of the node according to a storing order, the storing order based on a degree of matching the telemetry information with the SLO.

7. The node of claim 6, wherein the processing circuitry is configured to:

decode a reconfiguration request received via the NIC;

retrieve a second resource mapping from the data structure, the second resource mapping associated with a highest degree of matching the telemetry information with the SLO; and perform a subsequent reconfiguration of the available computing resources in response to the reconfiguration request, the subsequent reconfiguration based on the second resource mapping.

8. The node of claim 6, wherein the processing circuitry is configured to:

establish a secure communication path to at least a second computing node in the MEC network; and decode a registration request for additional resource mappings, the registration request received via the NIC.

9. The node of claim 8, wherein the registration request includes the additional resource mappings, and wherein the processing circuitry is configured to:

update the data structure with the additional resource mappings.

10. The node of claim 1, wherein the processing circuitry is configured to:

select the plurality of settings and the subset of computing resources from the set of available computing resources according to a pre-configured selection function.

11. The node of claim 10, wherein the pre-configured selection function is at least one of:

a simulated annealing function;
a random forest selection function; and
a Bayesian function.

12. The node of claim 1, wherein the processing circuitry is configured to:

decode a configuration message from a second computing node in the MEC network, the configuration message indicating the plurality of settings and the subset of computing resources.

13. The node of claim 1, wherein the processing circuitry is configured to:

decode a configuration message from a second computing node in the MEC network, the configuration message indicating a pre-configured selection function; and select the plurality of settings and the subset of computing resources from the set of available computing resources according to the pre-configured selection function.

14. The node of claim 1, wherein the available computing resources include one or more of:

central processing unit (CPU) resources, the CPU resources comprising a number of CPU cores configured to operate at a corresponding frequency setting;

power resources;

storage resources; and communication resources, the communication resources comprising communication modem resources.

15. At least one non-transitory machine-readable storage medium comprising instructions stored thereupon, which when executed by processing circuitry of a computing node operable to implement an orchestration management entity in a Multi-Access Edge Computing (MEC) network, cause the processing circuitry to perform operations comprising:

selecting a subset of computing resources from a set of available computing resources of the node to initiate a parameter sweep, the parameter sweep associated with a parameter sweep request received via a network interface card (NIC);

applying a plurality of settings to each computing resource of the subset to generate a plurality of resource mappings during the parameter sweep, each resource mapping of the plurality of resource mappings indicating at least one computing resource of the subset and a corresponding at least one setting of the plurality of settings;

retrieving telemetry information for the subset of computing resources, the telemetry information generated during the parameter sweep;

selecting a resource mapping of the plurality of resource mappings based on a comparison of the telemetry information with a service level objective (SLO) associated with the request; and performing a reconfiguration of the available computing resources based on the selected resource mapping.

16. The at least one non-transitory machine-readable storage medium of claim 15, wherein:

the request includes the SLO, a duration of the parameter sweep, and identification information of a machine state register (MSR) of a memory of the node; and the MSR stores a token, and wherein the token indicates at least one prior resource mapping generated during a prior parameter sweep of the set of available resources, the at least one prior resource mapping indicating prior settings and a prior subset of the available computing resources.

17. The at least one non-transitory machine-readable storage medium of claim 16, wherein the processing circuitry further performs operations comprising:
applying the prior settings to the prior subset of the available computing resources as an initial configuration of the node associated with the parameter sweep.

18. A system configured to manage entities in a Multi-Access Edge Computing (MEC) network, the system comprising:
memory; and
processing circuitry coupled to the memory, the processing circuitry configured to:
select a subset of computing resources from a set of available computing resources of a node to initiate a parameter sweep, the parameter sweep associated with a parameter sweep request received via a network interface card (NIC);
apply a plurality of settings to each computing resource of the subset to generate a plurality of resource mappings during the parameter sweep, each resource mapping of the plurality of resource mappings indicating at least one computing resource of the subset and a corresponding at least one setting of the plurality of settings;
retrieve telemetry information for the subset of computing resources, the telemetry information generated during the parameter sweep;
select a resource mapping of the plurality of resource mappings based on a comparison of the telemetry information with a service level objective (SLO) associated with the request; and
perform a reconfiguration of the available computing resources based on the selected resource mapping.

19. The system of claim 18, wherein the processing circuitry is further configured to:
select a subset of resource mappings from the plurality of resource mappings based on the comparison of the telemetry information with the SLO associated with the request;
apply a hash function to each resource mapping in the subset of resource mappings to generate a subset of tokens; and
store each token of the subset of tokens and a corresponding resource mapping of the subset of resource mappings in a data structure in a storage device of the node according to a storing order, the storing order based on a degree of matching the telemetry information with the SLO.

20. The system of claim 19, wherein the processing circuitry is further configured to:
decode a reconfiguration request received via the NIC;
retrieve a second resource mapping from the data structure, the second resource mapping associated with a highest degree of matching the telemetry information with the SLO; and
perform a subsequent reconfiguration of the available computing resources in response to the reconfiguration request, the subsequent reconfiguration based on the second resource mapping.

* * * * *